(12) United States Patent
DeRosa-Grund

(10) Patent No.: US 11,651,365 B2
(45) Date of Patent: *May 16, 2023

(54) BLOCKCHAIN ARCHITECTURE, SYSTEM, METHOD AND DEVICE FOR AUTOMATED CYBERSECURITY AND DATA PRIVACY LAW COMPLIANCE WITH PROPRIETARY OFF-CHAIN STORAGE MECHANISM

(71) Applicant: H. Anthony DeRosa-Grund, Magnolia, TX (US)

(72) Inventor: H. Anthony DeRosa-Grund, Magnolia, TX (US)

(73) Assignee: Atrium Separate IP Holdings Number 4, LLC, Sheridan, WY (US)

(*) Notice: Subject to any disclaimer, the term of this patent is extended or adjusted under 35 U.S.C. 154(b) by 351 days.

This patent is subject to a terminal disclaimer.

(21) Appl. No.: 16/562,342

(22) Filed: Sep. 5, 2019

(65) Prior Publication Data

US 2020/0074461 A1 Mar. 5, 2020

Related U.S. Application Data

(60) Provisional application No. 62/727,449, filed on Sep. 5, 2018, provisional application No. 62/772,516, filed on Nov. 28, 2018.

(51) Int. Cl.
*G06Q 20/38* (2012.01)
*G06Q 20/12* (2012.01)
(Continued)

(52) U.S. Cl.
CPC ....... *G06Q 20/389* (2013.01); *G06F 21/6245* (2013.01); *G06Q 20/123* (2013.01);
(Continued)

(58) Field of Classification Search
CPC .............. G06Q 20/389; G06Q 20/123; G06Q 20/3829; G06Q 20/401; G06Q 20/40145;
(Continued)

(56) References Cited

U.S. PATENT DOCUMENTS 10,521,780 B1 * 12/2019 Hopkins, III .......... G06Q 20/12
11,049,128 B1 * 6/2021 Olson ................ G06Q 30/0226
(Continued)

OTHER PUBLICATIONS

Johnson, R.C. et al., "Secure Voice-Based authentication for mobile devices: vaulted voice verification. In Biometric and Surveillance Technology for Human and Activity Identification X",(vol. 8712,pp. 164-176) SPIW. (May 2013).
(Continued)

*Primary Examiner* — Courtney P Jones
(74) *Attorney, Agent, or Firm* — Haverstock & Owens, A Law Corporation

(57) ABSTRACT

A transaction platform including at least one or more public, public-private and/or private distributed ledgers or blockchains that together enable the secure effectuation and recordation of one or more transactions while maintaining transaction party confidentiality. The private distributed ledgers or blockchains are able to store, maintain and provide information about the parties related to the transactions which the distributed blockchains or databases are able to utilize in order to securely and quickly validate, execute and record the transactions in a manner that is GDPR and other data privacy law complaint.

37 Claims, 7 Drawing Sheets

(51) Int. Cl.
*G06Q 20/40* (2012.01)
*G06F 21/62* (2013.01)
*G06Q 30/02* (2012.01)
*H04L 9/06* (2006.01)
*G06Q 30/0251* (2023.01)
*H04L 9/00* (2022.01)

(52) U.S. Cl.
CPC ... *G06Q 20/3829* (2013.01); *G06Q 20/40145* (2013.01); *G06Q 30/0255* (2013.01); *H04L 9/0637* (2013.01); *H04L 9/0643* (2013.01); *G06Q 2220/00* (2013.01); *H04L 9/50* (2022.05)

(58) Field of Classification Search
CPC ............ G06Q 2220/00; G06F 21/6245; H04L 9/0643; H04L 9/0637
See application file for complete search history.

(56) References Cited

U.S. PATENT DOCUMENTS

| | | | |
|---|---|---|---|
| 2016/0092988 A1* | 3/2016 | Letourneau | G06Q 20/223 705/66 |
| 2017/0048230 A1 | 2/2017 | Johansson | |
| 2017/0300872 A1* | 10/2017 | Brown | G06Q 20/382 |
| 2017/0352012 A1 | 12/2017 | Hearn | |
| 2018/0323963 A1 | 11/2018 | Stollman | |
| 2019/0026821 A1* | 1/2019 | Bathen | G06Q 40/00 |
| 2019/0034975 A1 | 1/2019 | Rizk | |
| 2019/0130416 A1 | 5/2019 | Boudville | |
| 2019/0220603 A1 | 7/2019 | Gopalakrishnan | |
| 2019/0251527 A1 | 8/2019 | Surdak | |
| 2019/0340623 A1* | 11/2019 | Rivkind | G06Q 30/0185 |
| 2019/0363890 A1 | 11/2019 | Johnson | |
| 2019/0370866 A1* | 12/2019 | Lawbaugh | G06Q 30/0254 |
| 2019/0385215 A1* | 12/2019 | Ferenczi | G06Q 20/12 |
| 2020/0042773 A1 | 2/2020 | Benkreira et al. | |
| 2020/0051041 A1* | 2/2020 | Ko | H04L 9/3247 |
| 2020/0058023 A1* | 2/2020 | Travizano | G06Q 20/384 |
| 2020/0065922 A1* | 2/2020 | Goldstraj | G06Q 50/18 |
| 2020/0175003 A1* | 6/2020 | Jiang | G06Q 20/02 |
| 2020/0186962 A1 | 6/2020 | Moeller | |
| 2020/0210413 A1 | 7/2020 | Quick | |
| 2020/0242595 A1 | 7/2020 | Harrison | |
| 2020/0267163 A1 | 8/2020 | Wilson | |
| 2020/0320220 A1 | 10/2020 | Beno | |
| 2021/0049608 A1* | 2/2021 | Yang | G06Q 20/3827 |
| 2021/0182423 A1 | 6/2021 | Padmanabhan | |
| 2022/0123945 A1 | 4/2022 | Yang | |

OTHER PUBLICATIONS

Chang, Y.T. et al., "My Voiceprint is my authenticator: A two-layer authentication approach using voiceprint for voice assistants", (Aug. 2019).

* cited by examiner

BLOCKCHAIN ARCHITECTURE, SYSTEM, METHOD AND DEVICE FOR AUTOMATED CYBERSECURITY AND DATA PRIVACY LAW COMPLIANCE WITH PROPRIETARY OFF-CHAIN STORAGE MECHANISM

RELATED APPLICATIONS

This patent application claims priority under 35 U.S.C. § 119(e) of the co-pending U.S. Provisional Patent Application No. 62/727,449, filed Sep. 5, 2018, entitled "HYBRID DISTRIBUTED DATABASE SYSTEM, METHOD AND DEVICE," and co-pending, U.S. Provisional Patent Application No. 62/772,516, filed Nov. 28, 2018, entitled "HYBRID DISTRIBUTED DATABASE SYSTEM, METHOD AND DEVICE," both of which are hereby incorporated by reference.

FIELD OF THE INVENTION

The present invention relates to the field of distributed database systems. More particularly, the present invention relates to a plurality of interoperating distributed systems for enabling secure transactions.

BACKGROUND OF THE INVENTION

Blockchain was the first fully functional distributed ledger technology. However, deployed blockchains are plagued with problems that limit, and inhibit, its vast potential. These problems include inability to scale, limit to the number of transactions per second, security vulnerabilities, inefficiency, and costly and problematic consensus mechanisms.

SUMMARY OF THE INVENTION

A transaction platform including at least one or more private distributed ledgers or blockchains that together enable the secure effectuation and recordation of one or more transactions while maintaining transaction party confidentiality. The private distributed ledgers or blockchains are able to store, maintain and provide information about the parties related to the transactions which the public distributed blockchain or database is able to utilize in order to securely and quickly validate, execute and record the transactions. Each of the distributed blockchains or databases is able to be a public or private blockchain (e.g. a distributed blockchain or database across a plurality of computing devices that each store copies of transactions in one or more linked blocks in a manner consistent with data privacy laws such as GDPR; including, but not limited to same's Right of Erasure) that maintains a continuously-growing list of data records hardened against tampering and revision. In some embodiments, a distributed database consists of data structure blocks with each block holding one individual transaction and/or the results of any blockchain executables. Each block of the blockchain is able to comprise a timestamp and information linking it to a previous block thereby defining the chain and maintaining an order of each of the records/transactions. In some embodiments, the platform utilizes a brand new delegated proof of transaction consensus method that enables the transaction to be recorded in near real-time by assuming the "buyer" and "seller" are known good actors (such as in credit card processing systems for example) before consensus has been determined and corrected afterwards in the case of rightfully disputed transactions. In some embodiments, each block of the platform comprises only a single transaction such that the transaction is able to be corrected without disrupting other transactions (if other transactions were also recorded on the same block).

In some embodiments, the transaction platform enables the targeted distribution of advertisement content to users along with exacting the distribution and enforcement of an agreed upon monetary compensation to the users for the viewing of that content, all without the unwanted sharing of the personal identification and other data about the users used to target the content. In some embodiments, the transaction platform enables the investment in the production of media content and the distribution of compensation for the investment (e.g. providing access to the produced media content upon completion). In some embodiments, the transaction platform provides an off-chain database management system, that complies with General Data Protection Regulation (GDPR), and other data privacy laws, by only utilizing de-identified, encrypted, pseudoanonymized and fully anonymized user data to record transactions while securely storing the native user data separate from the transaction ledgers/blockchains such that erasure is able to be effectuated upon demand by the removal of the stored native user data thereby anonymizing the data recorded on the blocks having the associated transactions. This is done in a manner so not to compromise the very immutability of those blockchains. In some embodiments, the native user data for each user is stored on an off-chain micro-identifier chain (MIDC). The micro-identifier chains can be combined to form a micro-identifier chain array ("MIDC Array(s)") for the transaction platform. In such embodiments, for each user, only a specified single transaction block ("STB") of their micro-identification chain that stores de-identified user data is able to be accessed by the main blockchain(s) in order to form on-chain transactions. The data stored on the main chain(s), and the other single transaction blocks of the micro-identification chain(s) is kept secure from any intruders. This embodiment is also GDPR and other data privacy law compliant.

A first aspect is directed a blockchain transaction platform for executing transactions between a buyer and a seller. The platform comprises at least one buyer blockchain operating system storing a plurality of buyer accounts of users of a transaction application, the buyer accounts each including a buyer identifier and a set of buyer encrypted keys associated with the buyer account, a private buyer blockchain that includes a separate single transaction block for each of the buyer accounts that includes encrypted forms of the buyer identifier and an account balance indicating a current value of the buyer account, at least one seller blockchain operating system storing a plurality of seller accounts each including a seller identifier, a set of seller encrypted keys associated with the seller account and sales information, the sales information including one or more product identifiers of products for sale by the seller account and parameters of sales offers associated with each of the products, a private seller blockchain that includes a block for each of the products that includes an encrypted form of the product identifier of that product and a smart contract configured to enforce the parameters of the sales offer of that product, a notary blockchain that includes a separate single transaction block storing details of each transaction between any one of the buyer accounts and any one of the seller accounts and at least one notary blockchain operating system including a transaction engine configured to receive a transaction request for a transaction from a buyer device, the transaction request including the product identifier of one of the products and the buyer identifier of one of the buyer accounts, request, receive and execute the smart contract of the one of the products from the seller blockchain operating system in order to complete the transaction and generate and post a single transaction block on the notary blockchain before full node consensus for the transaction has been determined, the single transaction block including transaction data describing the transaction.

In some embodiments, the private seller blockchain includes a separate single transaction block for each of the seller accounts that includes encrypted forms of the seller identifier and an account balance indicating a current value of the seller account. In some embodiments, the notary blockchain operating system executes the smart contract by transferring an amount of money indicated in the smart contract from the buyer account identified by the buyer identifier in the request to the seller account associated with the smart contract. In some embodiments, when the smart contract is executed, the buyer blockchain operating system posts a new single transaction block to the buyer blockchain that changes the account balance of the one of the buyer accounts based on the transaction details, and the seller blockchain operating system posts a new single transaction block to the seller blockchain that changes the account balance of one of the seller accounts associated with the product identifier based on the transaction details. In some embodiments, the notary blockchain operating system includes a dispute resolution function that settles disputed transactions and produces a settlement summary that indicates how the disputed transaction should be adjusted. In some embodiments, the notary blockchain operating system generates and posts a single updated transaction block on the notary blockchain based on the settlement summary, the single updated transaction block including transaction data describing the adjustments to the disputed transaction indicated in the settlement summary. In some embodiments, when the notary blockchain operating system generates and posts a single updated transaction block on the notary blockchain based on the settlement summary, for each of the buyer accounts whose account balance is changed by the settlement summary, the buyer blockchain operating system posts a new single updated transaction block to the buyer blockchain that changes the account balance of the buyer accounts based on the settlement summary, and for each of the seller accounts whose account balance is changed by the settlement summary, the seller blockchain operating system posts a new single updated transaction block to the seller blockchain that changes the account balance of the seller accounts based on the settlement summary. In some embodiments, the request includes the buyer keys of the one of the buyer accounts and the transaction engine is configured to determining consensus for the transaction after the single transaction block is posted to the notary blockchain by validating whether the buyer keys of the transaction request are authentic. In some embodiments, the buyer keys are stored on the buyer device and the buyer blockchain operating system prevents use of the buyer keys in the transaction request unless a user of the buyer device passes a biometric verification test. In some embodiments, the biometric verification test includes inputting biometric data from the user comprising one or more of a face image, an retinal image, a fingerprint and a voice signal and determining if the inputted biometric data matches stored reference biometric data associated with the buyer account. In some embodiments, the transaction data includes one or more of the seller identifier, the buyer identifier, the product identifier, a price of the product and a time of the transaction, a value of currency paid to the seller identified by the seller identifier and a percentage of the value owed to the notary blockchain operating system. In some embodiments, upon receiving a ripcord command from a buyer device associated with one of the buyer accounts, the buyer blockchain operating system is configured to delete the buyer identifier associated with the buyer account.

A second aspect is directed to a blockchain transaction system of a blockchain transaction platform for executing transactions between a buyer and a seller, the platform including at least one buyer blockchain operating system storing a plurality of buyer accounts of users of a transaction application, the buyer accounts each including a buyer identifier and a set of buyer encrypted keys associated with the buyer account, a private buyer blockchain that includes a separate single transaction block for each of the buyer accounts that includes encrypted forms of the buyer identifier and an account balance indicating a current value of the buyer account, at least one seller blockchain operating system storing a plurality of seller accounts each including a seller identifier, a set of seller encrypted keys associated with the seller account and sales information, the sales information including one or more product identifiers of products for sale by the seller account and parameters of sales offers associated with each of the products and a private seller blockchain that includes a block for each of the products that includes an encrypted form of the product identifier of that product and a smart contract configured to enforce the parameters of the sales offer of that product. The system comprises a public notary blockchain that includes a separate single transaction block storing details of each transaction between any one of the buyer accounts and any one of the seller accounts and at least one notary blockchain operating system including a transaction engine configured to receive a transaction request for a transaction from a buyer device, the transaction request including the product identifier of one of the products and the buyer identifier of one of the buyer accounts, request, receive and execute the smart contract of the one of the products from the seller blockchain operating system in order to complete the transaction and generate and post a single transaction block on the notary blockchain before consensus for the transaction has been determined, the single transaction block including transaction data describing the transaction.

In some embodiments, the private seller blockchain includes a separate single transaction block for each of the seller accounts that includes encrypted forms of the seller identifier and an account balance indicating a current value of the seller account. In some embodiments, the notary blockchain operating system executes the smart contract by transferring an amount of money indicated in the smart contract from the buyer account identified by the buyer identifier in the request to the seller account associated with the smart contract. In some embodiments, when the smart contract is executed, the buyer blockchain operating system posts a new single transaction block to the buyer blockchain that changes the account balance of the one of the buyer accounts based on the transaction details, and the seller blockchain operating system posts a new single transaction block to the seller blockchain that changes the account balance of one of the seller accounts associated with the product identifier based on the transaction details. In some embodiments, the notary blockchain operating system includes a dispute resolution function that settles disputed transactions and produces a settlement summary that indicates how the disputed transaction should be adjusted. In some embodiments, the notary blockchain operating system generates and posts a single updated transaction block on the notary blockchain based on the settlement summary, the single updated transaction block including transaction data describing the adjustments to the disputed transaction indicated in the settlement summary. In some embodiments, when the notary blockchain operating system generates and posts a single updated transaction block on the notary blockchain based on the settlement summary, for each of the buyer accounts whose account balance is changed by the settlement summary, the buyer blockchain operating system posts a new single updated transaction block to the buyer blockchain that changes the account balance of the buyer accounts based on the settlement summary, and for each of the seller accounts whose account balance is changed by the settlement summary, the seller blockchain operating system posts a new single updated transaction block to the seller blockchain that changes the account balance of the seller accounts based on the settlement summary. In some embodiments, the request includes the buyer keys of the one of the buyer accounts and the transaction engine is configured to determining consensus for the transaction after the single transaction block is posted to the notary blockchain by validating whether the buyer keys of the transaction request are authentic. In some embodiments, the buyer keys are stored on the buyer device and the buyer blockchain operating system prevents use of the buyer keys in the transaction request unless a user of the buyer device passes a biometric verification test. In some embodiments, the biometric verification test includes inputting biometric data from the user comprising one or more of a face image, an retinal image, a fingerprint and a voice signal and determining if the inputted biometric data matches stored reference biometric data associated with the buyer account. In some embodiments, the transaction data includes one or more of the seller identifier, the buyer identifier, the product identifier, a price of the product and a time of the transaction, a value of currency paid to the seller identified by the seller identifier and a percentage of the value owed to the notary blockchain operating system. In some embodiments, upon receiving a ripcord command from a buyer device associated with one of the buyer accounts, the buyer blockchain operating system is configured to delete the buyer identifier associated with the buyer account.

A third aspect is directed to a method of executing transactions between a buyer and a seller in blockchain transaction platform. The method comprises storing a plurality of buyer accounts of users of a transaction application with at least one buyer blockchain operating system, the buyer accounts each including a buyer identifier and a set of buyer encrypted keys associated with the buyer account, generating with the buyer blockchain operating system a separate single transaction block for each of the buyer accounts on a private buyer blockchain, wherein the separate single transaction block that includes encrypted forms of the buyer identifier and an account balance indicating a current value of the buyer account, storing a plurality of seller accounts with at least one seller blockchain operating system, the seller accounts each including a seller identifier, a set of seller encrypted keys associated with the seller account and sales information, the sales information including one or more product identifiers of products for sale by the seller account and parameters of sales offers associated with each of the products, generating with the seller blockchain operating system a block for each of the products on a private seller blockchain, the single transaction block including an encrypted form of the product identifier of that product and a smart contract configured to enforce the parameters of the sales offer of that product, receiving with at least one notary blockchain operating system a transaction request for a transaction from a buyer device, the transaction request including the product identifier of one of the products and the buyer identifier of one of the buyer accounts, requesting, receiving and executing with the notary blockchain operating system the smart contract of the one of the products from the seller blockchain operating system in order to complete the transaction and generating and posting with the notary blockchain operating system a single transaction block on a notary blockchain before consensus for the transaction has been determined, the single transaction block including transaction data describing the transaction.

In some embodiments, the method further comprises generating with the seller blockchain operating system a separate single transaction block for each of the seller accounts on the seller blockchain, the separate single transaction block including encrypted forms of the seller identifier and an account balance indicating a current value of the seller account. In some embodiments, executing the smart contract includes transferring an amount of money indicated in the smart contract from the buyer account identified by the buyer identifier in the request to the seller account associated with the smart contract. In some embodiments, when the smart contract is executed, further comprising posting with the buyer blockchain operating system a new single transaction block to the buyer blockchain that changes the account balance of the one of the buyer accounts based on the transaction details, and posting with the seller blockchain operating system a new single transaction block to the seller blockchain that changes the account balance of one of the seller accounts associated with the product identifier based on the transaction details. In some embodiments, the method further comprises settling disputed transactions and producing a settlement summary that indicates how the disputed transaction should be adjusted with the notary blockchain operating system. In some embodiments, the method further comprises generating and posting with the notary blockchain operating system a single updated transaction block on the notary blockchain based on the settlement summary, the single updated transaction block including transaction data describing the adjustments to the disputed transaction indicated in the settlement summary. In some embodiments, when the notary blockchain operating system generates and posts the single updated transaction block on the notary blockchain based on the settlement summary, further comprising for each of the buyer accounts whose account balance is changed by the settlement summary, posting with the buyer blockchain operating system a new single updated transaction block to the buyer blockchain that changes the account balance of the buyer accounts based on the settlement summary, and for each of the seller accounts whose account balance is changed by the settlement summary, posting with the seller blockchain operating system a new single updated transaction block to the seller blockchain that changes the account balance of the seller accounts based on the settlement summary. In some embodiments, the request includes the buyer keys of the one of the buyer accounts, further comprising determining consensus for the transaction with the transaction engine after the single transaction block is posted to the notary blockchain by validating whether the buyer keys of the transaction request are authentic. In some embodiments, the buyer keys are stored on the buyer device, further comprising preventing use of the buyer keys in the transaction request with the buyer blockchain operating system unless a user of the buyer device passes a biometric verification test. In some embodiments, the biometric verification test includes inputting biometric data from the user comprising one or more of a face image, an retinal image, a fingerprint and a voice signal and determining if the inputted biometric data matches stored reference biometric data associated with the buyer account. In some embodiments, the transaction data includes one or more of the seller identifier, the buyer identifier, the product identifier, a price of the product and a time of the transaction, a value of currency paid to the seller identified by the seller identifier and a percentage of the value owed to the notary blockchain operating system. In some embodiments, the method further comprises deleting the buyer identifier associated with the buyer account with the buyer blockchain operating system upon receiving a ripcord command from a buyer device associated with one of the buyer accounts.

DETAILED DESCRIPTION OF THE INVENTION

Embodiments are directed to a transaction platform including at least one public-private and or one or more private permissioned distributed ledger(s) or blockchain(s) that together enable the secure effectuation and recordation of one or more transactions while maintaining transaction party confidentiality. The private distributed ledgers or blockchains are able to store, maintain and provide information about the parties related to the transactions which the public and/or private permissioned distributed blockchain is able to utilize in order to securely and quickly validate, execute and record the transactions. Each of the distributed blockchains is able to be a public or private permissioned blockchain (e.g. a distributed blockchain or database across a plurality of computing devices that each store copies of transactions in one or more linked blocks) that maintains a continuously-growing list of data records hardened against tampering and revision. In some embodiments, a distributed database consists of data structure blocks with each block holding a single individual transaction and/or the results of any blockchain executables. Each block of the blockchain is able to comprise a timestamp and information linking it to a previous block thereby defining the chain and maintaining an order of each of the records/transactions. In some embodiments, the platform utilizes a brand new delegated proof of transaction consensus that enables the transaction to be recorded before full node consensus has been determined and corrected afterwards in the case of rightfully disputed transactions. In some embodiments, each block of the platform comprises only a single transaction such that the transaction is able to be corrected without disrupting other transactions (if other transactions were also recorded on the same block).

Blockchain Transaction System

Figure 1:
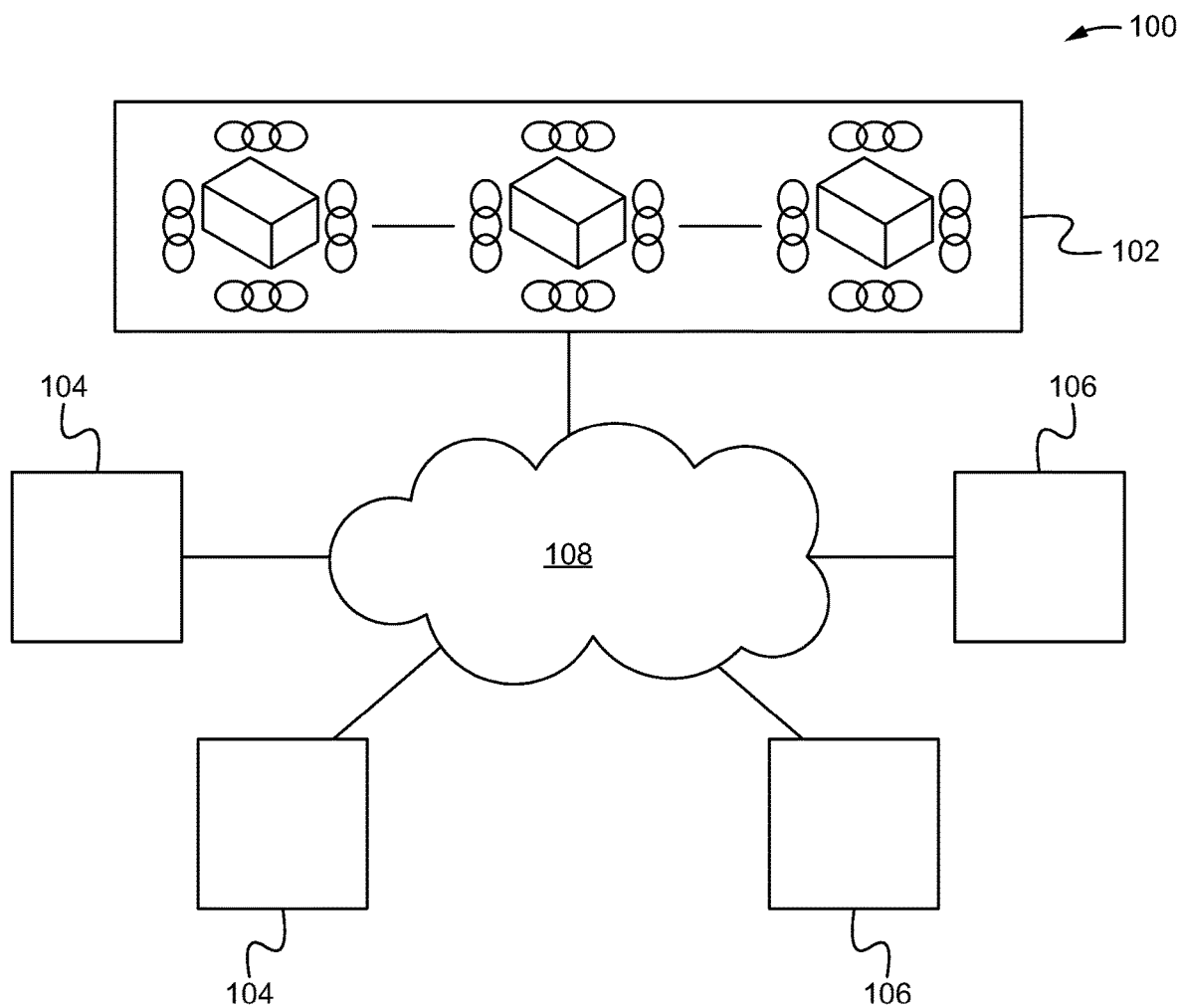
FIG. 1 illustrates a blockchain transaction system according to some embodiments.

FIG. 1 illustrates a blockchain transaction system 100 according to some embodiments. As shown in FIG. 1, the system 100 comprises a transaction platform 102 coupled with one or more buyer devices 104 and one or more seller devices 106 over one or more networks 108. The networks 108 are able to be one or a combination of wired or wireless networks as are well known in the art. Although as shown in FIG. 1 one transaction platform 102 is coupled with two buyer devices 104 and two seller devices 106, it is understood that the system 100 is able to comprise any number of platforms 102, buyers devices 104 and/or seller devices 106 coupled together via the network 108.

Figure 2:
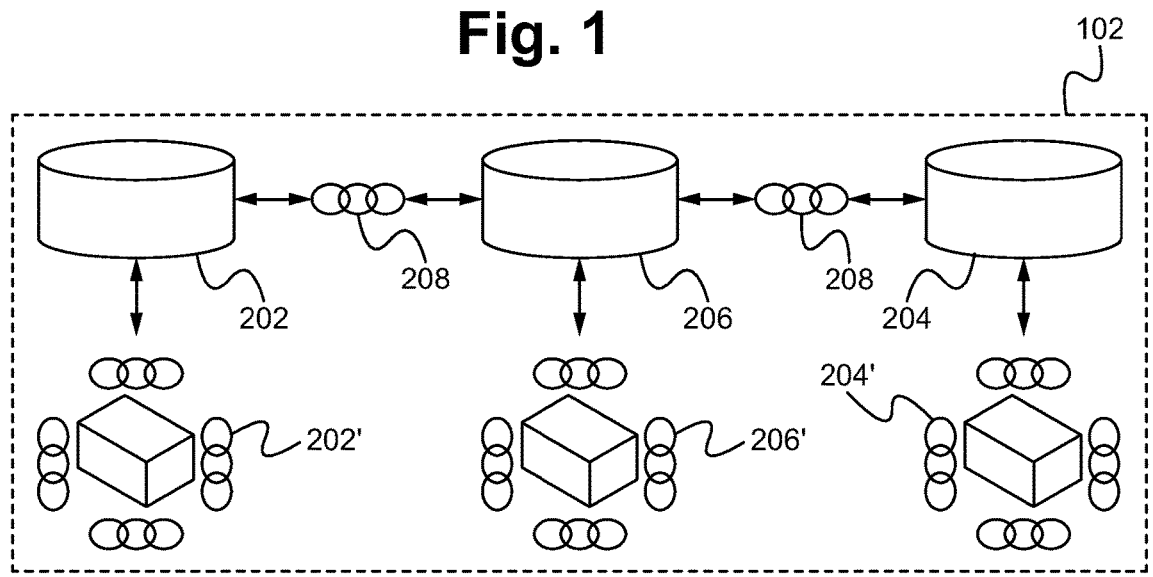
FIG. 2 illustrates a detailed view of the transaction platform according to some embodiments.

FIG. 2 illustrates a detailed view of the transaction platform 102 according to some embodiments. As shown in FIG. 2, the platform comprises one or more buyer blockchain operating systems (e.g. residing on one or more physical servers or the cloud) 202 operating a buyer blockchain 202', one or more seller blockchain operating systems (e.g. residing on one or more physical servers or the cloud) 204 operating a seller blockchain 204' and a notary blockchain operating system (e.g. residing on one or more physical servers or the cloud) 206 operating a notary blockchain 206'. The operating systems 202, 204, 206 (and the associated blockchains) are able to be coupled together over the network 108 (and/or a different network). In some embodiments, the platform 102 includes one or more side chains 208 coupled between the operating systems 202, 204, 206. Specifically, the sidechains are able to be mechanisms that allow tokens and other digital assets from one blockchain to be securely used in a separate blockchain and then be moved back to the original blockchain if needed. In other words, the pegged sidechains are a blockchain that is attached to the parent chain (blockchain) through the two-way peg mechanism which allows bidirectional transfer of assets between the parent chain and the sidechain at a fixed deterministic exchange rate by using a separate token currency tied to the parent chain. In such embodiments, by using a two-way peg mechanism, the unauthorized creation of tokens and sidechains is precluded. Alternatively, the side chains 208 are able to be omitted. The buyer and/or seller blockchains 202', 204' are able to be private permissioned blockchains and the notary blockchain 206' is able to be a public/private hybrid blockchain (or a public blockchain or a private permissioned). For example, the blocks of the blockchains 202', 204' are able to only be viewed by a permissioned user (e.g. having a valid account on the system 100). The operating systems 202, 204, 206 are able to be secure operating systems utilizing encryption in order to protect stored data.

In some embodiments, the blockchains 202', 204', 206' are plasma network blockchain and smart contract platforms featuring on-chain, off-chain and/or cross-chain atomic swaps, lightning network functionality, two-way pegged sidechains and/or instant payments. In some embodiments, the smart contracts are automated smart contracts each containing a set of rules under which the advertiser, the platform and the user have already agreed that when the rules are met (e.g. exact match between ad target personal data and user personal data), the agreement is automatically enforced. Specifically, the smart contract code facilitates, verifies and enforces the performance of that agreement and results in a transaction, and smart contract, that is saved to the transaction blockchain, where proportional pre-determined amounts from the proceeds of the transaction (as specified in the contract) are directed to the user, the platform and/or other entities.

The operating systems 202, 204, 206 (and/or the devices 104, 106 if the application is downloadable) include a transaction application that enables the hardware of the operating systems 202, 204, 206 (and/or the devices 104, 106) to perform the functions of the system 100 described herein. In some embodiments, the buyer and/or seller operating systems 202, 204 implement their portions of the application as a transaction website and/or include a downloadable transaction application that users are able to visit (e.g. via a web browser) and/or download onto their devices 104, 106 in order to access the features of the buyer and seller operating systems 202, 204 described below. Specifically, the website and/or downloadable application are able to provide a user interface for receiving and responding to commands/request/input from users and communicating that data to the operating systems 202, 204 via the networks 108.

In some embodiments, each instance of the application stored on each of the operating systems 202, 204, 206 (and/or the devices 104, 106) is able to perform all of the functions described herein. Alternatively, separate instances of the application stored on each of the operating systems 202, 204, 206 (and/or the devices 104, 106) are able to be dedicated to separate functions needed by that server 202, 204, 206 (and/or device 104, 106) such that they work together to perform the functions of the system 100. Although for the sake of brevity the discussion herein describes an exemplary distribution of the functions of the application on the system 100 between the operating systems 202, 204, 206 (and/or the devices 104, 106), it is understood that other function distributions are contemplated.

The buyer blockchain operating system 202 includes a buyer transaction engine of the transaction application for executing the functions of the buyer blockchain operating system 202. The buyer transaction engine is able to comprise a login and registration module, an encryption module, a purchase module, a ledger module and a ripcord module. The seller blockchain operating system 204 includes a seller transaction engine of the transaction application for executing the functions of the seller blockchain operating system 204. The seller transaction engine is able to comprise a login and registration module, an encryption module, a sales module, a ledger module, a sales module and a ripcord module. Finally, the notary blockchain operating system 206 is able to include a notary transaction engine of the transaction application for executing the functions of the notary blockchain operating system 206. The notary transaction engine is able to comprise a request/query module, a payment processing module, a security module, a notary module and a dispute module.

The seller and buyer login and registration modules both enable a user (i.e. buyer/seller) to create an account on the transaction system 100 by inputting username and password information, a native identifier (e.g. name), personal information about the user, contact information (e.g. phone number, email) and/or banking information (i.e. for depositing money from another account into the user's account on the system 100 and vice versa) via a graphical user interface (e.g. of a website and/or transaction application). In some embodiments, the personal information includes biometric data (iris scan, voice recording, fingerprint scan, etc.) for implementing biometric verification as described in detail below. In some embodiments, the personal information is able to be omitted for the seller login and registration module. This account information is then associated with a newly generated account such that the information is able to be used to identify the user when logging onto the system 100 and other functions of the system 100. The personal information is able to comprise one or more of the account owner's age, gender, address, income level, religion, political affiliation, race, nationality, interests, height, hair color, eye color, weight, medical conditions, family members, education level, degrees earned, occupation and/or other characteristics of the user. The username, password and personal information are able to be stored on an account database (e.g. on the server 202, 204) or another network accessible location. After the account is created, the user is able to access the account and any associated data (e.g. to edit the personal data) by entering the username and password in order to identify themselves to the system 100.

Once an account is registered, the encryption module for both the seller and buyer operating systems 202, 204 inputs the data associated with the account, issues one or more encryption keys and generates a unique buyer/seller identifier (e.g. alpha-numeric identifier) for the user/account. Subsequently, the module encrypts both the unique buyer/seller identifier and the personal information associated with the account. The encryption keys are able to be used by the buyers/sellers to digitally sign transactions/smart contracts in order to effectuate the transactions on the system. In some embodiments, the encryption keys are multi-blade, multi-key post quantum signature protocol keys. In some embodiments, the keys work for single user, multi-use, single signature and multi-signature operations. In some embodiments, the keys are reliant only on hash functions and do not require special math theory.

In some embodiments, the encryption module enables the buyer and/or seller devices 104, 106 to store their encryption keys and only allow those keys to be accessed with one or more of a password (e.g. submitted to the platform by the user) and/or one or more secondary biometric validators (e.g. facial recognition, fingerprint recognition, voice recognition, iris recognition). The password and/or biometric data (e.g. facial data, fingerprint data, voice data, iris data) that is used for each account is able to be inputted by the platform during the registration process and stored and associated with the account (as a part of the account data). For example, in such embodiments when a buyer wants to make a purchase using the platform, the platform is able to automatically request submission of the password and/or biometric data before retrieving the keys and initiating the request for the transaction. Additionally, this allows the devices 104, 106 to not only be used as off-chain key storage, but also as a token wallet wherein if lost or stolen all value is able to be restored when a new/replacement device's biometrics and/or password confirm that it is again in the rightful owner's possession (and any tokens or keys on lost/stolen devices 104, 106 are able to be invalidated remotely).

The buyer and seller ledger modules then add the encrypted account data to the buyer/seller blockchains 202', 204' as a new single transaction block including an account balance value. If the buyer/seller has made or has yet to make a deposit when the account is initially created, the account balance recorded on the initial block for that account will indicate the value of that initial deposit. Subsequently, as described below, each deposit into or withdrawal from the system 100 (e.g. due to a transaction, buyer/seller deposit or withdrawal) for the account will be reflected in a new single transaction block on the buyer/seller blockchain 202', 204' generated and posted by the buyer/seller ledger module that reflects the updated balance for that account. Additionally, as describe below, when account balance corrections are required (e.g. because of transactions that were posted but then found to be invalid by the security module), the ledger modules automatically update/correct the account balances on the blockchains 202', 204' by posting "correction" blocks that correct the account balance as necessary. In some embodiments, the buyer and seller ledger modules post, update and maintain separate ledgers for deposits/sales, withdrawals/purchases, and the running account balance on the buyer and seller blockchains 202', 204'. As a result, each user account will have three associated ledgers comprised of single transaction blocks, one indicating each subsequent deposit/sale, one indicating each subsequent withdrawal/purchase and one indicating the running balance (as changed by the deposits and withdrawals).

In some embodiments, the account balances of the buyer and seller accounts are made up of a virtual currency or coin issued by the system 100 and any payments within the system 100 are made using the virtual currency. In some embodiments, the virtual currency comprises continuous "mint and burn" tokens/coins. Specifically, as more seller and/or buyers register on the system, the system is able to issue/mint new tokens for any deposited money and burn tokens as they are redeemed for their monetary value. In particular, the operating systems are able to record a smart contract on the buyer and/or seller blockchains evidencing the redeeming of the tokens and identifying the coins as burned such that they cannot be reused.

On the seller blockchain operating system 204, the seller sales module inputs product and/or service information (e.g. description, price, delivery options and other product/service details) that the seller wishes to provide for sale on the system 204. In some embodiments, the sales module provides a unique identifier for each of the products/services. Upon submission of the product/service information, the sales module generates a smart contract that reflects the indicated parameters of the sale of the product/service along with the encrypted seller unique identifier and/or the product/service identifier. The sales module then adds this smart contract and the identifier(s) as a single transaction block for each product/service on the seller blockchain 204'. Thus, the information stored on the seller/buyer blockchains 202', 204' is fully de-identified (fully encrypted, pseudoanonymized and anonymized) such that it is not connectable to any natural user identification information.

The purchase module of the buyer blockchain operating system 202 enables a user to view and purchase one or more of a list of product and/or services that have been provided for purchase by the sellers via a smart contract on a block on the sellers blockchain 204' on the system 100. Specifically, the products and/or services presented are able to reflect the terms of the open smart contracts for the products and/or services created by the sellers and stored on the seller blockchain 204' such that the buyers are able to choose whether they agree to those terms and to complete the smart contract. Once a buyer submits a purchase command to the purchase module (e.g. via a buyer device 104), the module generates and transmits a purchase request to the notary blockchain operating system 206' including one or more of the encrypted buyer unique identifier, the unique product/service identifier of the products/services to be purchased, the seller unique identifier and/or one or more buyer encryption keys of the account.

The request/query module of the notary blockchain operating system 206 receives these requests and uses the unique product/service identifier and/or the seller unique identifier to query the seller blockchain operating system 204 for the associated smart contract on the seller blockchain 204'. The seller blockchain operating system 204 fetches the contract information of the associated smart contract from the seller blockchain 204' and transmits the contract information to the notary blockchain operating system 206. The request/query module then is able to send confirmation, within band, by two factor authentication, or out of band requests to the buyer and the seller devices 104, 106 (e.g. using the contact information included during the registration of the buyer/seller accounts). In some embodiments, the confirmation requests comprise a challenge message that needs to be digitally signed by the buyer and seller devices 104, 106 using their respective buyer/seller encrypted keys. These digital signatures are able to later be validated by notary blockchain operating system 206 (e.g. using the associated paired keys known by the notary blockchain operating system 206) as a part of determining if there is node consensus for the transaction as described below.

After the request/query module receives confirmation from the buyer and the seller, the payment processing module processes the payment indicated in the smart contract. Specifically, the module requests/receives from the buyer blockchain operating system fiat money or digital tokens from the account associated with the buyer identifier equal to the price indicated in the smart contract, and transfers the money/tokens to the owed parties (e.g. the account of the seller identifier and/or the system fee account). In some embodiments, the payment processing module ensures that all tokens/monies remain within the control of the notary blockchain operating system 206 and/or a central authority until a physical withdrawal is effectuated by a user. In some embodiments, if buyers effectuate a payment method other than from a pre-existing balance from the buyer's system account (e.g. via a 3rd-party credit card), the payment processing module is able to still processes the payment in parallel with the validation of the transaction. If one or more tokens, or fiat currencies, are stolen from a buyer and/or seller account, because all users are known because they must have been previously onboarded and registered on a permissioned chain, the buyer and/or seller blockchain operating systems 202, 204 are able to trace the tokens and record on the notary blockchain 206' that the tokens are no longer valid as well as replacing the stolen tokens in the account with newly minted tokens.

The ledger modules of the seller and buyer operating systems 202, 204 each post a new single transaction block indicating the adjustment to the existing account balance to the seller/buyer accounts on the seller and buyer blockchains 202', 204', respectively. Each of these transactions is added to the blockchains 202', 204' as a single transaction block (rather than multiple transactions in a single block) such that if there is a dispute or error, the single transaction block having the error is able to be corrected by a new updated single transaction block added to the chains 202', 204'. For example, a fraudulent charge indicated in a first single transaction block on the buyer blockchain 202' is able to be corrected by a subsequent updated single transaction block crediting the charged amount back to the account (thereby correcting the indicated account total). This would not be possible if a single block was used for multiple transactions because the fraudulent transaction could not be corrected without also affecting all the other non-fraudulent transactions contained within that block.

At the same time (e.g. before, simultaneously or concurrently), the notary module effectuates the delivery and posting of the transaction. Specifically, the module digitally delivers the product to the buyer (e.g. buyer device 104) if a digital product or sends a message to the seller to deliver the digital or non-digital product to the buyer (e.g. buyer device 104 or buyer shipping address). Further, the module generates and notarizes and posts as a single transaction block on the notary blockchain 206' a new final smart contract indicating the completion of the transaction. These blocks are able to be time-stamped, posted ordered and validated in real-time. In particular, unlike other blockchain systems, the notary module posts the block without first waiting for a full node consensus that the transaction is valid (e.g. not fraudulent). This enables the system 100 to post transactions faster than any existing blockchain system resulting in greater throughput and efficiency of the system 100. The posted block is able to indicate the terms of the transaction (e.g. price, date, payment, and other transaction data), as well as the seller and buyer encrypted unique identifiers (and/or the product identifier). Additionally, because like the seller/buyer blockchains 202', 204' (and unlike other blockchain systems), the contract is posted as a single transaction block on the notary blockchain 206', the transactions are able to be later corrected by adding a new single transaction block to the blockchain 206' that indicates any necessary modifications to the original block.

Also at the same time (e.g. before, simultaneously or concurrently), the security module performs a proof of transaction consensus process on the transaction in order to validate the transaction is not fraudulent or otherwise invalid. In some embodiments, the security module performs the proof of transaction consensus process by verifying that the buyer encryption keys submitted by the buyer blockchain operating system 202 are valid keys that are associated with the encrypted buyer identifier using a hash verification of the keys. In some embodiments, the security module includes artificial intelligence in order to aid in the speedy determination of consensus of each of the transactions. In some embodiments, the security module generates and issues automatic reusable encryption keys for the buyers and sellers if they did not have pre-existing encryption keys. If the proof of transaction fails, the security module notifies the notary module and the buyer/seller ledger modules so the notary module is able to post a new single transaction block correcting (e.g. nullifying) the transaction on the notary blockchain 206' and the ledger modules are able to similarly post new single transaction block s correcting the account balances of the seller and buyer on the seller/buyer blockchains 202', 204'.

The dispute module receives transaction disputes from buyers and/or sellers and resolves the disputes even after the single transaction block of the transaction has been posted to the notary blockchain 206' without compromising immutability of the blockchain 206'. Specifically, the dispute module operates as the central authority by determining if the smart contract conditions were met (e.g. payment made, product delivered) and adjudicates disputes and determine resolution adjustments (if necessary) to the disputed transaction. Upon determination of the resolution of the dispute, if necessary, the notary module, the buyer ledger module and/or the seller ledger module each post a new single transaction block to their associated blockchains 202', 204', 206' tied to the previously posted block (and any "family") for the transaction reflecting the dispute results and thereby correcting any previously posted block reflecting the disputed transaction. In particular, the notary module of the notary blockchain operating system 206 is able to receive the dispute results and share those results with the buyer and seller operating systems 202, 204 such that each of the operating systems 202, 204, 206 are able to appropriately adjust their associated blockchains 202', 204', 206' based on the dispute results.

As a result, related transactions (original blocks and subsequent corrections) are able to be readily grouped by and easily viewed on the chains 202', 204', 206' as a "family" of blocks all related to the same transaction. Thus, the dispute module provides the benefit of being able to effectuate reconciliation of a dispute within the system 100 without compromising the immutability of the blockchains 202', 204', 206'. Thus, the notary blockchain operating system 206 and/or notary blockchain 206' provide the benefit of being able to run transaction processing, validation and posting of ordered single transaction blocks in real-time (e.g. posting before consensus is complete) as well as providing dispute resolution in order to correct errors and/or fraudulent charges. In some embodiments, the dispute module includes a loss mitigation function (e.g. powered by artificial intelligence and/or machine learning) that monitors transactions submitted to the notary blockchain operating system 206 and identifies and stops suspicious transactions from being completed (e.g. from being recorded on the blockchains at all).

Additionally at any time the buyer/seller ripcord modules enable the buyers/seller to exercise their "right to be forgotten" under the general data protection regulation (GDPR), or other data privacy laws, and leave the system 100. Specifically, upon receiving a removal command from a buyer and/or seller the ripcord modules automatically delete the native user personal private information stored on the buyer/seller operating systems 202, 204. As a result, once this native user information is removed, the encrypted data that remains on the blockchains 202', 204' and/or 206' can no longer be linked to the user (buyer/seller). Thus, the system 100 provides the benefit of being GDPR (and other data privacy laws) compliant while maintaining the benefits of the blockchains immutability.

Figure 3:
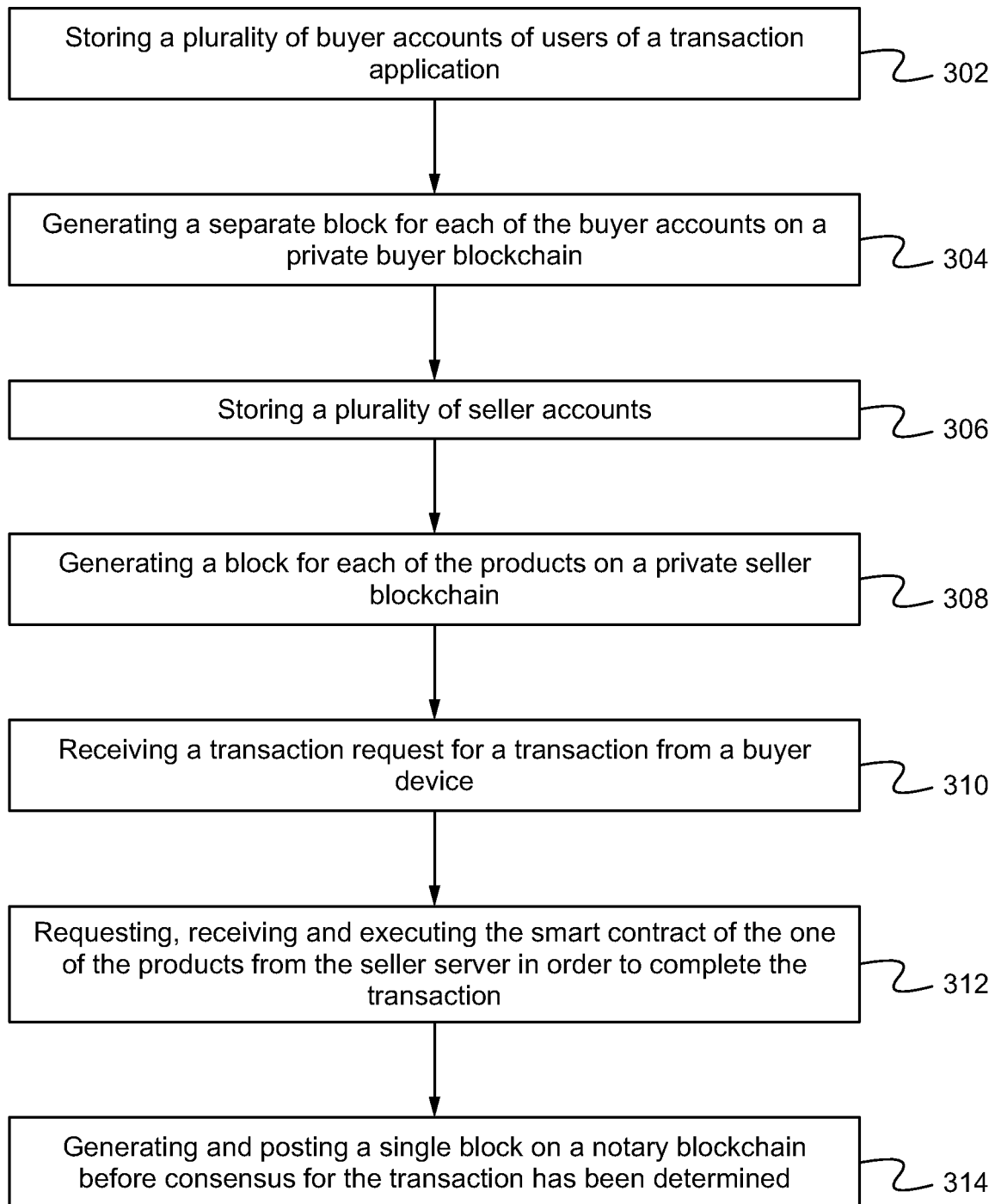
FIG. 3 illustrates a method of implementing a blockchain transaction system according to some embodiments.

FIG. 3 illustrates a method of implementing a blockchain transaction system 100 according to some embodiments. As shown in FIG. 3, the buyer blockchain operating system 202 stores a plurality of buyer accounts of users of a transaction application at the step 302. In some embodiments, the buyer accounts each include a buyer identifier and a set of buyer encrypted keys associated with the buyer account. The buyer blockchain operating system 202 generates a separate single transaction block for each of the buyer accounts on a private buyer blockchain 202' at the step 304. In some embodiments, the separate single transaction block includes encrypted forms of the buyer identifier and an account balance indicating a current value of the buyer account. The seller blockchain operating system 204 stores a plurality of seller accounts at the step 306. In some embodiments, the seller accounts each include a seller identifier, a set of seller encrypted keys associated with the seller account and sales information, the sales information including one or more product identifiers of products for sale by the seller account and parameters of sales offers associated with each of the products. The seller blockchain operating system 204 generates a block for each of the products on a private seller blockchain 204' at the step 308. In some embodiments, the single transaction block includes an encrypted form of the product identifier of that product and a smart contract configured to enforce the parameters of the sales offer of that product.

The notary blockchain operating system 206 receives a transaction request for a transaction from a buyer device 104 at the step 310. In some embodiments, the transaction request includes the product identifier of one of the products and the buyer identifier of one of the buyer accounts. The notary blockchain operating system 206 request, receives and executes the smart contract of the one of the products from the seller blockchain operating system 204 in order to complete the transaction at the step 312. The notary blockchain operating system 206 generates and posts a single transaction block on a notary blockchain 206' before full node consensus for the transaction has been determined at the step 314. In some embodiments, the single transaction block including transaction data describing the transaction. As a result, the method provides the advantage of enabling transactions to be quickly posted before full node consensus has been determined while also being correctable due to each block only storing a single transaction such that errors are able to be corrected to subsequent single transaction correction blocks. This in contrast to other blockchain systems where full node consensus is required before blocks are able to be posted and thousands of transactions are stored on a transaction blocks containing multiple transactions such that to change an error on a block with a new single transaction block would require costly disruption of all of the other transactions that do not include an error on that block—which would also compromise the immutability of those existing chains due to their existing architectures.

In some embodiments, the seller blockchain operating system 204 generates a separate single transaction block for each of the seller accounts on the seller blockchain 204'. This separate single transaction block is able to include encrypted forms of the seller identifier and an account balance indicating a current value of the seller account. In some embodiment, executing the smart contract includes transferring an amount of money indicated in the smart contract from the buyer account identified by the buyer identifier in the request to the seller account associated with the smart contract. In some embodiments, when the smart contract is executed, the buyer blockchain operating system 202 posts a new single transaction block to the buyer blockchain that changes the account balance of the one of the buyer accounts based on the transaction details, and the seller blockchain operating system 204 posts a new single transaction block to the seller blockchain that changes the account balance of one of the seller accounts associated with the product identifier based on the transaction details. In some embodiments, the notary blockchain operating system 206 settles disputed transactions and produces a settlement summary that indicates how the disputed transaction should be adjusted. In such embodiments, the notary blockchain operating system 206 is able to generate and post a single updated transaction block on the notary blockchain based on the settlement summary. In such embodiments, the single updated transaction block is able to include transaction data describing the adjustments to the disputed transaction indicated in the settlement summary.

In some embodiments, when the notary blockchain operating system 206 generates and posts the single updated transaction block on the notary blockchain 206' based on the settlement summary, for each of the buyer and seller accounts whose account balance is changed by the settlement summary, the buyer and seller operating systems 202, 204 post new single update blocks to the buyer and seller blockchains 202', 204' that change the account balance of the buyer and seller accounts based on the settlement summary. In some embodiments, the request includes the buyer keys of the one of the buyer accounts, and transaction engine determines consensus for the transaction after the single transaction block is posted to the notary blockchain 206' by validating whether the buyer keys of the transaction request are authentic. In some embodiments, the buyer keys are stored on the buyer device, and the buyer blockchain operating system 202 prevents use of the buyer keys in the transaction request unless a user of the buyer device 104 passes a biometric verification test. In such embodiments, the biometric verification test is able to include inputting biometric data from the user comprising one or more of a face image, an retinal image, a fingerprint and a voice signal and determining if the inputted biometric data matches stored reference biometric data associated with the buyer account. In some embodiments, the buyer blockchain operating system 202 deletes the buyer identifier associated with the buyer account in response to receiving a ripcord command from a buyer device 104 associated with one of the buyer accounts. As a result, the method provides the advantage of retaining the benefits of the immutability of the blockchains while still being GDPR and other data privacy law compliant and able to fully de-identify any user data/and or user stored private personal information at the request of the user without compromising the immutability of the systems on-chain blocks and blockchains.

Figure 5:
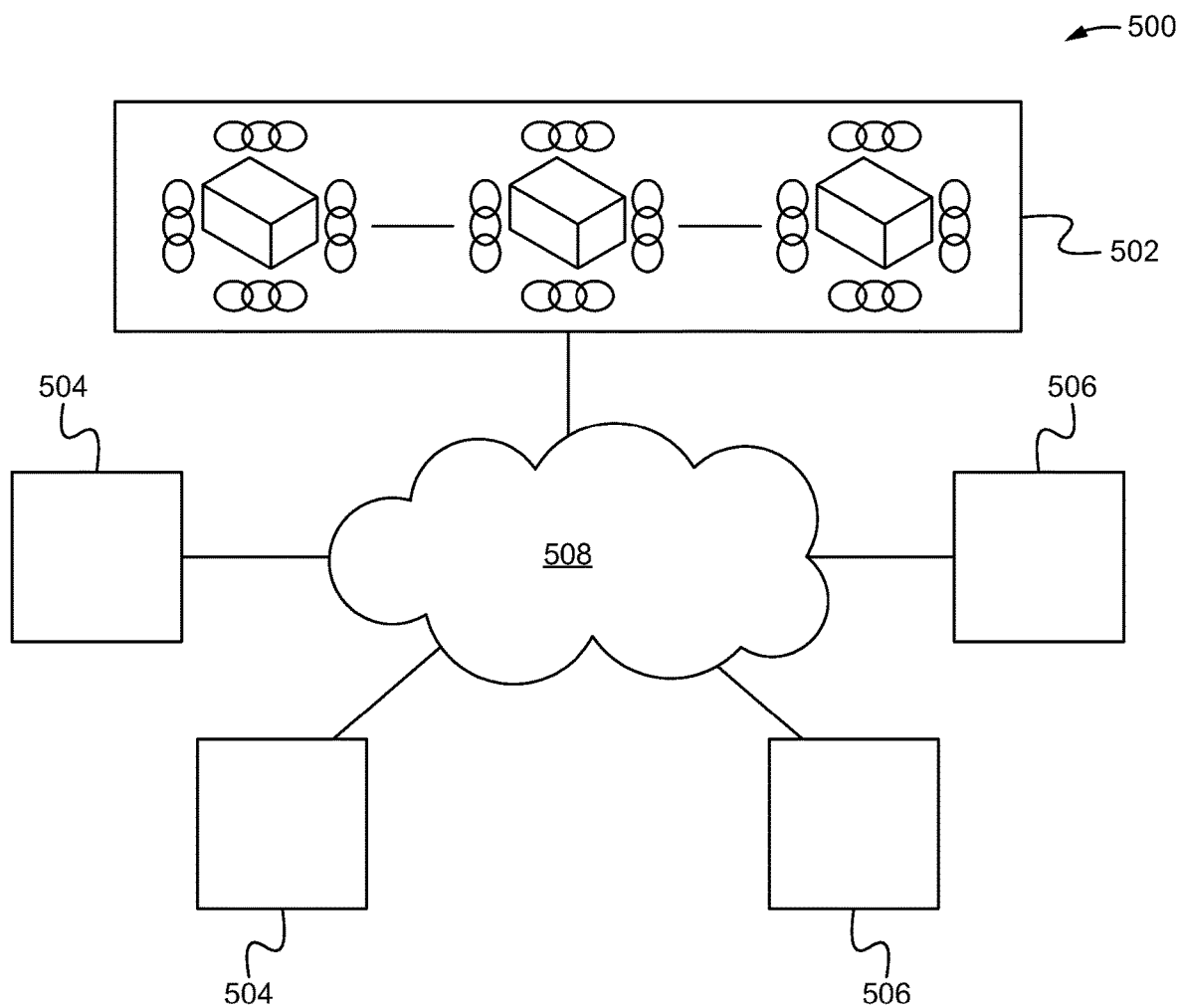
FIG. 5 illustrates a blockchain advertising distribution system according to some embodiments.

Advertisement Distribution System FIG. 5 illustrates a blockchain advertising distribution system 500 according to some embodiments. The system 500 is able to be substantially similar to the system 100 except for the differences described herein. As shown in FIG. 5, the system 500 comprises an advertisement platform 502 coupled with one or more user devices 504 and one or more advertiser devices 506 over one or more networks 508. The networks 508 are able to be one or a combination of wired or wireless networks as are well known in the art. Although as shown in FIG. 5 one advertisement platform 502 is coupled with two user devices 504 and two advertiser devices 506, it is understood that the system 500 is able to comprise any number of platforms 502, user devices 504 and/or advertiser devices 506 coupled together via the network 508.

Figure 6:
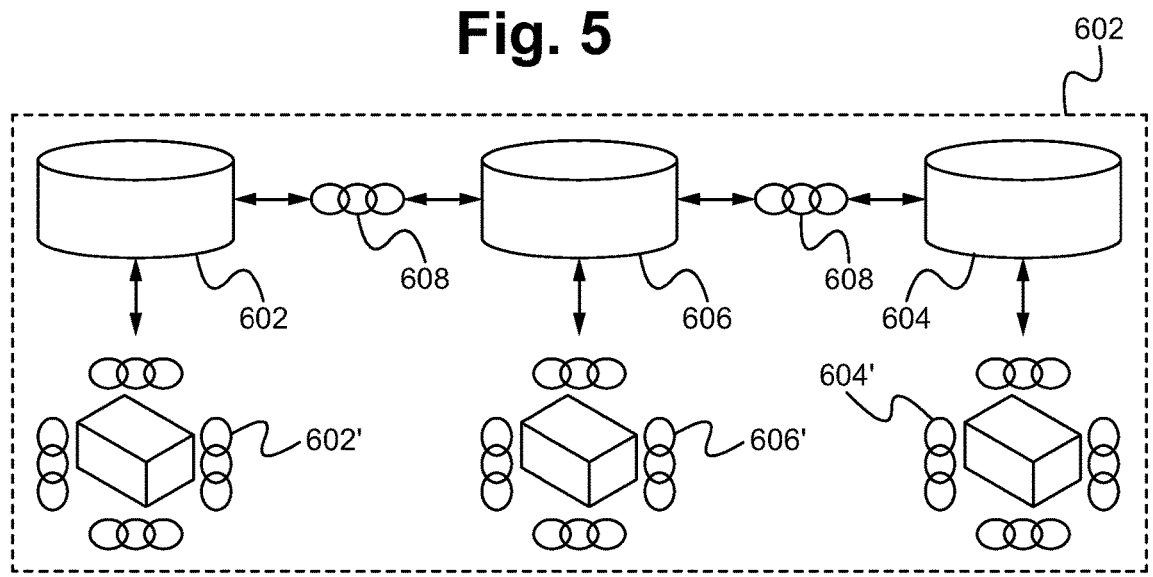
FIG. 6 illustrates a detailed view of the advertisement platform according to some embodiments.

FIG. 6 illustrates a detailed view of the advertisement platform 502 according to some embodiments. The advertisement platform 502 is able to be substantially similar to the transaction platform 102 except for the differences described herein. As shown in FIG. 6, the platform 502 comprises one or more user blockchain operating systems (e.g. residing on one or more physical servers or the cloud) 602 operating a user blockchain 602', one or more advertiser blockchain operating systems (e.g. residing on one or more physical servers or the cloud) 604 operating an advertiser blockchain 604' and a transaction blockchain operating systems (e.g. residing on one or more physical servers or the cloud) 606 operating a transaction blockchain 606'. The operating systems 602, 604, 606 (and the associated blockchains) are able to be coupled together over the network 508 (and/or a different network). In some embodiments, the platform 502 includes one or more sidechains 608 coupled between the operating systems 602, 604, 606. Specifically, the sidechains are able to be mechanisms that allow tokens and other digital assets from one blockchain to be securely used in a separate single transaction blockchain and then be moved back to the original blockchain if needed. In other words, the pegged sidechains are a blockchain that is attached to the parent chain (blockchain) through the two-way peg mechanism which allows bidirectional transfer of assets between the parent chain and the sidechain at a fixed deterministic exchange rate by using a separate token currency tied to the parent chain. In such embodiments, by using a two-way peg mechanism, the unauthorized creation of tokens and sidechains is precluded. Alternatively, the sidechains 608 are able to be omitted. The user and/or advertiser blockchains 602', 604' are able to be private permissioned blockchains and the transaction blockchain 606' is able to be a public/private hybrid blockchain (or a public blockchain). For example, the blocks of the blockchains 602', 604' are able to only be viewed by a permissioned user (e.g. having a valid account on the system 500). The operating systems 602, 604, 606 are able to be secure operating systems utilizing encryption in order to protect stored data.

In some embodiments, the blockchains 602', 604', 606' are plasma type network blockchain and smart contract platforms featuring on-chain, off-chain and/or cross-chain atomic swaps, lightning network functionality, two-way pegged sidechains and/or instant payments. In some embodiments, the smart contracts are automated smart contracts each containing a set of rules under which the advertiser, the platform and the user have already agreed that when the rules are met (e.g. exact match between ad target personal data and user personal data), the agreement is automatically enforced. Specifically, the smart contract code facilitates, verifies and enforces the performance of that agreement and results in a transaction, and smart contract, that is saved to the transaction blockchain, where proportional pre-determined amounts from the proceeds of the viewing of the ad (as specified in the contract) are directed to the user, the platform and/or other entities.

The operating systems 602, 604, 606 (and/or the devices 504, 506 if the application is downloadable) include an advertisement/media distribution application that enables the hardware of the operating systems 602, 604, 606 (and/or the devices 504, 506) to perform the functions of the system 500 described herein. In some embodiments, the user, transaction and/or advertiser operating systems 602, 604, 606 operate their portion of the application as an advertisement/media distribution website and/or include a downloadable advertisement/media distribution application that users are able to visit (e.g. via a web browser) and/or download onto their devices 504, 506 in order to access the features of the operating systems 602, 604, 606 described below. Specifically, the website and/or downloadable application are able to provide a user interface for receiving and responding to commands/request/input from users, receiving ads and/or other media and/or communicating data to the operating systems 602, 604, 606 via the networks 508. Additionally, the website and/or downloadable application are able to provide other functions separate from or in conjunction with the operating systems 602, 604, 606 as described in detail below.

In some embodiments, each instance of the application stored on each of the operating systems 602, 604, 606 (and/or the devices 504, 506) is able to perform all of the functions described herein. Alternatively, separate instances of the application stored on each of the operating systems 602, 604, 606 (and/or the devices 504, 506) are able to be dedicated to separate functions needed by that operating system 602, 604, 606 (and/or device 504, 506) such that they work together to perform the functions of the system 500. Although for the sake of brevity the discussion herein describes an exemplary distribution of the functions of the application on the system 500 between the operating systems 602, 604, 606 (and/or the devices 504, 506), it is understood that other function distributions are contemplated.

The application on the user blockchain operating system 602 (and/or user device 504) is able to comprise a login and registration module, an encryption module, a ledger module, an ad viewing module and/or a ripcord module. The application on the advertiser blockchain operating system 604 (and/or advertiser device 506) is able to comprise a login and registration module, an encryption module, a ledger module, an ad upload module and/or a ripcord module. Finally, the application on the transaction blockchain operating system 606 is able to comprise a matching module, a payment module, a security module, and/or a dispute module.

The login and registration modules of both operating systems 602, 604 enable an entity (i.e. user/advertiser) to create an account on the advertisement system 500 by inputting username and password information, a native identifier (e.g. name, company), personal information about the entity, contact information (e.g. phone number, email) and/or banking information (i.e. for depositing money from another account into the user's account on the system 500 and vice versa) via a graphical user interface (e.g. of a website and/or distribution application). In some embodiments, the personal information is able to be omitted for the advertiser module. The personal information is able to comprise one or more of the account owner's location (region, country, province, state, town, zip code, street, address), age, gender, address, income level, religion, income, marital status, political affiliation, race, nationality, interests, height, hair color, eye color, weight, medical conditions, family members, education level, degrees earned, occupation and/or other characteristics of the user. In some embodiments, the personal information also includes biometric data (iris scan, voice recording, fingerprint scan, etc.) for implementing biometric verification as described in detail below. In some embodiments, one or both of the operating systems 602, 604 require the user/advertiser to proactively and knowingly op-in to agree to enable the system 500 to use their personal data and/or other data associated with their account (e.g. to match ads with their targeted demographics based on the personal data). In such embodiments, the system 500 is able to ensure that the user/advertiser is not able to be determined based on the user of the personal data and/or data recorded on the transaction blockchain 606'.

This account information is then associated with a newly generated account such that the information is able to be used to identify the user when logging onto the system 500 and other functions of the system 500 (e.g. advertisement matching). For example, the username, password and personal information are able to be stored on an account blockchain (e.g. on the operating system 602, 604) or another network accessible location. After the account is created, the user is able to access the account and any associated data (e.g. to edit the personal data) by entering the username and password in order to identify themselves to the system 500.

Once an account is registered, the encryption module for both the advertiser and user operating systems 602, 604 inputs the data associated with the account and generates a unique user/advertiser identifier (e.g. alpha-numeric identifier) for the user/account. These identifiers are then able to be used to identify the account and/or the personal and other information associated with the account. Subsequently, the module is able to encrypt the unique user/advertiser identifier and the personal information associated with the account.

The user and advertiser ledger modules then add the encrypted account data to the user/advertiser blockchains 602', 604' as a new single transaction block including an account balance value. If the user/advertiser has made or has yet to make a deposit when the account is initially created, the account balance recorded on the initial block for that account will indicate the value of that initial deposit. Subsequently, as described below, each deposit into or withdrawal from the system 500 (e.g. due to a transaction, user/advertiser deposit or withdrawal) for the account will be reflected in a new single transaction block on the user/advertiser blockchain 602', 604' generated and posted by the user/advertiser ledger module that reflects the updated balance for that account. Additionally, in some embodiments as describe below, when account balance corrections are required (e.g. because of transactions that were posted but then found to be invalid by the security module), the ledger modules automatically update/correct the account balances on the blockchains 602', 604' by posting "correction" blocks that correct the account balance as necessary. In some embodiments, the user and advertiser ledger modules post, update and maintain separate ledgers for deposits/sales, withdrawals/purchases, and the running account balance on the user and advertiser blockchains 602', 604'. As a result, each user account is able to have three associated ledgers of blocks, one indicating each subsequent deposit, one indicating each subsequent withdrawal and one indicating the running balance (as changed by the deposits and withdrawals). Alternatively, the ledger modules are able to be omitted.

In some embodiments, the account balances of the user and advertiser accounts are made up of a virtual currency or coin issued by the system 500 and any payments within the system 500 are made using the virtual currency. In some embodiments, the virtual currency comprises continuous "mint and burn" tokens/coins. Specifically, as more users and/or advertisers register on the system, the system is able to issue/mint new tokens for any deposited money and burn tokens as they are redeemed for their monetary value. In particular, the operating systems are able to record a smart contract on the user and/or advertiser blockchains evidencing the redeeming of the tokens and identifying the coins as burned such that they cannot be reused.

On the advertiser blockchain operating system 604, the ad upload module inputs advertisement data (e.g. from the advertiser devices 506) comprising advertisement content (e.g. video, text and/or audio of the ad) and target demographic data (e.g. selected values or ranges of values for any of the personal information characteristics described above including Boolean combinations thereof) that the advertiser wishes to provide as an ad on the system 500. For example, the advertiser is able to upload an ad for a car along with demographic data specifying an age range of 20-25 and a location region of within 20 miles of an input location as the target demographic. As a result, only user's whose personal information match those target parameters will be shown that car ad. In some embodiments, the ad upload module provides a unique ad identifier for each of the ads so that they are able to be uniquely identified within the system 500. In some embodiments, the advertisement data includes a price per view value that indicates a value that the advertiser is willing to pay per viewing of the ad. Alternatively, a default or predetermined price per view is applied by the transaction blockchain operating system 606 and/or the system 500 to all or a subset of the ads. Upon submission of the advertisement data, the ad upload module is able to link the uploaded advertisement data (e.g. content and demographic data) to the unique advertiser identifier of the account/advertiser for which they were uploaded and/or the unique ad identifier (for that ad), and encrypt and record the data as a block on the advertiser blockchain 604'. Specifically, each ad is able to have a separate single transaction block including the above data on the advertiser blockchain 604'.

On the user blockchain operating system 602 and/or user device 504, the ad viewing module enables the user/user device 504 to indicate when they are ready to receive and view ads via the system 500. Specifically, the users are able to manually select/deselect an "online" option of the online module to indicate when they are ready to receive ads. Alternatively or in addition, the users are able to specify an automatic "online" detection where the online module monitors when the user is actively using the device (e.g. the device is not sleeping or in a low power mode, an internet browser is accessing content, a media player is accessing content, or other activity indications) and automatically determines when the user is ready to receive ads. In any case, when it is determined/indicated that ads are ready to be viewed, the module transmits a "user active" signal including the unique user identifier of the user to the transaction blockchain operating system 606 and waits to received ads from the transaction blockchain operating system 606. In some embodiments, the active signal includes a device identifier and/or the personal data associated with the user identifier. Alternatively, the transaction blockchain operating system 606 is able to determine the personal data for that user identifier by accessing the user blockchain 602'.

The matching module of the transaction blockchain operating system 606 receives the "user active" signal and determines the associated personal data. The matching module is then able to access the advertiser blockchain 604' and determine which of the ads recorded on the blockchain 604' have target demographic data that is exactly matched by the personal data. If there is at least one match, the matching module is then able to select one or a set of the ads that exactly match and generate a smart contract for each of the ads between the user and the advertiser who owns the ad (and the system as a fee). The smart contract is able to comprise one or more of the ad identifier, the user identifier, the advertiser identifier associated with the ad identifier (e.g. of the advertiser who uploaded the ad), a time, a date, payment data and/or other data about the transaction. The payment data is able to include an amount to be paid to the user by the advertiser, any taxes and/or a fee (e.g. static amount or percentage of total) to be paid to the system 500. At the same time, the matching module is able to retrieve and transmit the advertisement content of the selected ad (and/or the set of ads) to the ad viewing module for viewing by the user.

Upon receiving the advertisement content, the ad viewing module presents the ad to the user via the user device 504. Specifically, module is able to automatically determine media or other programs currently being viewed on the device 504 (e.g. a browser, media player and/or other media application), identify the viewed content (e.g. determine in real time the parameters of each web page, program or online destination the user navigates to) and automatically generate and present the advertisement content as an overlay on top of the viewed content (e.g. browser, player and/or application). In some embodiments, the module is able to determine areas of the viewed content that are unused or include advertisements and overlay the advertisement content on top of those spaces. Additionally, the module is able to identify when $3^{rd}$ party ads (e.g. ad breaks, pre-roll ads, interstitial ads, or other ads not from the system 500) are started in the viewed content and insert the advertisement content on top of the $3^{rd}$ party ads for their duration (and them remove the advertisement content after the duration is finished so as to not block the non-ad content that the user is accessing). In performing these functions, the module is able to not remove the existing content, rather it simply places the system ads on top of that content. In some embodiments, the module is able to automatically pause and/or cause the overlay to disappear temporarily if a user mouses over, touches or otherwise attempts to access the content hidden by the overlay on the device 504. In some embodiments, the module operates in the background of the user device 504.

Before, after and/or during the playing of the advertisement content, the ad viewing module is able to utilize mechanical and/or biometric feedback mechanisms (e.g. facial recognition, fingerprint recognition, voice recognition, iris recognition) on the user devices 504 in order to confirm that the users watch their screen when the ads are displayed on the overlay on the device 504. For example, the module is able to intermittently display confirmation mechanism (e.g. button that needs to be pressed or interacted with, password that needs to be input, fingerprint scan submitted, and/or the input of any of the other biometric and other data) in order for a user to confirm that they are viewing the advertisements. Specifically, the requested data to satisfy the mechanism is able to be one or more of the password and/or biometric data (e.g. facial data, fingerprint data, voice data, iris data) that is inputted by the application/operating systems 602, 604 during the registration process and stored and associated with the account (as a part of the account data). Additionally, this allows the devices 504, 506 to not only be used as a token wallet wherein if lost or stolen all value is able to be restored when a new/replacement device's biometrics and/or password confirm that it is again in the rightful owner's possession (and any tokens or keys on lost/stolen devices 504, 506 are able to be invalidated remotely).

In some embodiments, the ad viewing module is able to provide non-advertisement content in addition to the advertisement content. For example, instead of just overlaying ads on media from other currently viewed content sources on the device 504, via the module, the user is able to access media from the system 500 with the advertisement content being added to the provided media (e.g. where overlaying is no longer necessary). This system media is able to comprise any media content such as movies, music, television, social media, messaging services (e.g. direct/text messages) and/or interactive games or other media that it is able to play alongside the advertisements. In such embodiments, the system media is able to be stored and accessed from one or more of the operating systems 602, 604, 606.

Once the advertisement content has been viewed (and/or confirmed as viewed), the viewing module sends a confirmation message to the transaction blockchain operating system 606 indicating that the ad has been viewed and/or that another ad or set of ads are needed. The confirmation message is able to be sent for each ad, for a group of ads of a predetermined number, for any ads viewed within a set time period, and/or for any ads viewed during a user online session (e.g. from when the user became available until the user stopped being available as determined by the module or indicated by the user). The confirmation message, in band or out of band, is able to include the identifiers of each of the ads that were viewed and/or the unique user identifier of the user who viewed them. As a result, the system 500 provides the benefit of enabling advertisers to exactly match the users that receive their ads as well as providing compensation and motivation to user to view those ads that are specifically targeted to them. Further, all of this is provided on top of existing content being accessed by the user such that the user is not limited to only the content provided by the system 500.

After receiving the confirmation message, the payment module initiates the payment indicated in the smart contract generated for the ad and the matching module posts the smart contract to the transaction blockchain 606' to record the transaction. Specifically, the smart contract is able to be encrypted and posted to the blockchain 606' as a single transaction block. The blocks are able to be time-stamped, posted ordered and validated in real-time. In particular, unlike other blockchain systems, the transaction module posts the single transaction block without first waiting for a full node consensus that the transaction is valid (e.g. not fraudulent). This enables the system 500 to post transactions faster than any existing blockchain system resulting in greater throughput and efficiency of the system 500. Additionally, because like the advertiser/user blockchains 602', 604' (and unlike other blockchain systems), the contract is posted as a single transaction block on the transaction blockchain 606', the transactions are able to be later corrected by adding a new single transaction block to the blockchain 606' that indicates any necessary modifications to the original block. Also at the same time (e.g. before, simultaneously or concurrently), in some embodiments the security module performs a proof of transaction consensus process on the transaction in order to validate the transaction is not fraudulent or otherwise invalid in the same manner as the system 100 described above.

The payment module processes the payment as indicated in the smart contract. Specifically, the module requests/receives from the user blockchain operating system 602' money/tokens from the account associated with the user identifier equal to the price indicated in the smart contract, and transfers the money/tokens to the owed parties (e.g. the account of the advertiser identifier and/or the system fee account). In some embodiments, the payment processing module ensures that all tokens/monies remain within the control of the transaction blockchain operating system 606 and/or a central authority until a physical withdrawal is effectuated by a user. In some embodiments, if users effectuate a payment method other than from a pre-existing balance from the user's system account (e.g. via a 3rd-party credit card), the payment processing module is able to still processes the payment in parallel with the validation of the transaction. If one or more tokens, or fiat currencies, are stolen from a user and/or advertiser account, because all users are known, the user and/or advertiser operating systems 602, 604 are able to trace the tokens, or adjust account balances, and record on the transaction blockchain 606' that the tokens (or account balances) are no longer valid as well as replacing the stolen tokens, in the account with newly minted tokens or transferring fraudulently obtained fiat currency balances back to their rightful account holders.

The ledger modules of the advertiser and user operating systems 602, 604 each post a new single transaction block indicating the adjustment to the existing account balance to the advertiser/user accounts on the advertiser and user blockchains 602', 604', respectively. Each of these transactions is added to the blockchains 602', 604' as a single transaction block (rather than multiple transactions in a single block) such that if there is a dispute or error, the single transaction block having the error is able to be corrected by a new single transaction block added to the chains 602', 604'. For example, a fraudulent charge indicated in a first block on the user blockchain 602' is able to be corrected by a subsequent single transaction block crediting the charged amount back to the account (thereby correcting the indicated account total). This would not be possible if a single block was used for multiple transactions because the fraudulent transaction could not be corrected without also affecting all the other non-fraudulent transactions on the block or compromising the very immutability of that blockchain.

The dispute module receives transaction disputes from users and/or advertisers and resolves the disputes even after the single transaction block of the transaction has been posted to the transaction blockchain 606' without compromising immutability of the blockchain 606'. Specifically, the dispute module operates as the central authority by determining if the smart contract conditions were met (e.g. payment made, accounts valid, ad viewed) and adjudicates disputes and determine resolution adjustments (if necessary) to the disputed transaction. Upon determination of the resolution of the dispute, if necessary, one or more of the matching module, the user ledger module and/or the advertiser ledger module post a new single transaction block to their associated blockchains 602', 604', 606' tied to the previously posted block (and any "family") for the transaction reflecting the dispute results and thereby correcting any previously posted block reflecting the disputed transaction. In particular, the matching module is able to receive the dispute results and share those results with the user and advertiser operating systems 602, 604 such that each of the operating systems 602, 604, 606 are able to appropriately adjust their associated blockchains 602', 604', 606' based on the dispute results.

As a result, related transactions (original blocks and subsequent corrections) are able to be readily grouped by and easily viewed on the chains 602', 604', 606' as a "family" of blocks all related to the same transaction. Thus, the dispute module provides the benefit of being able to effectuate reconciliation of a dispute within the system 100 without compromising the immutability of the blockchains 602', 604', 606'. Thus, the transaction blockchain operating system 606 and/or transaction blockchain 606' provide the benefit of being able to run transaction processing, validation and posting of ordered single transaction blocks in real-time (e.g. posting before consensus is complete) as well as providing dispute resolution in order to correct errors and/or fraudulent charges. In some embodiments, the dispute module includes a loss mitigation function (e.g. powered by artificial intelligence and/or machine learning) that monitors transactions submitted to the transaction blockchain operating system 606 and identifies and stops suspicious transactions from being completed (e.g. from being recorded on the blockchains at all).

Additionally at any time the user/advertiser ripcord modules enable the users/advertiser to exercise their "right to be forgotten" under the general data protection regulation (GDPR) and leave the system 500. Specifically, upon receiving a removal command from a user and/or advertiser the ripcord modules automatically delete the native user information stored on the user/advertiser operating systems 602, 604. As a result, once this native user information is removed, the encrypted data that remains on the blockchains 602', 604' and/or 606' can no longer be linked to the user (user/advertiser). Thus, the system 500 provides the benefit of being GDPR compliant while maintaining the benefits of the blockchains' immutability.

Figure 7:
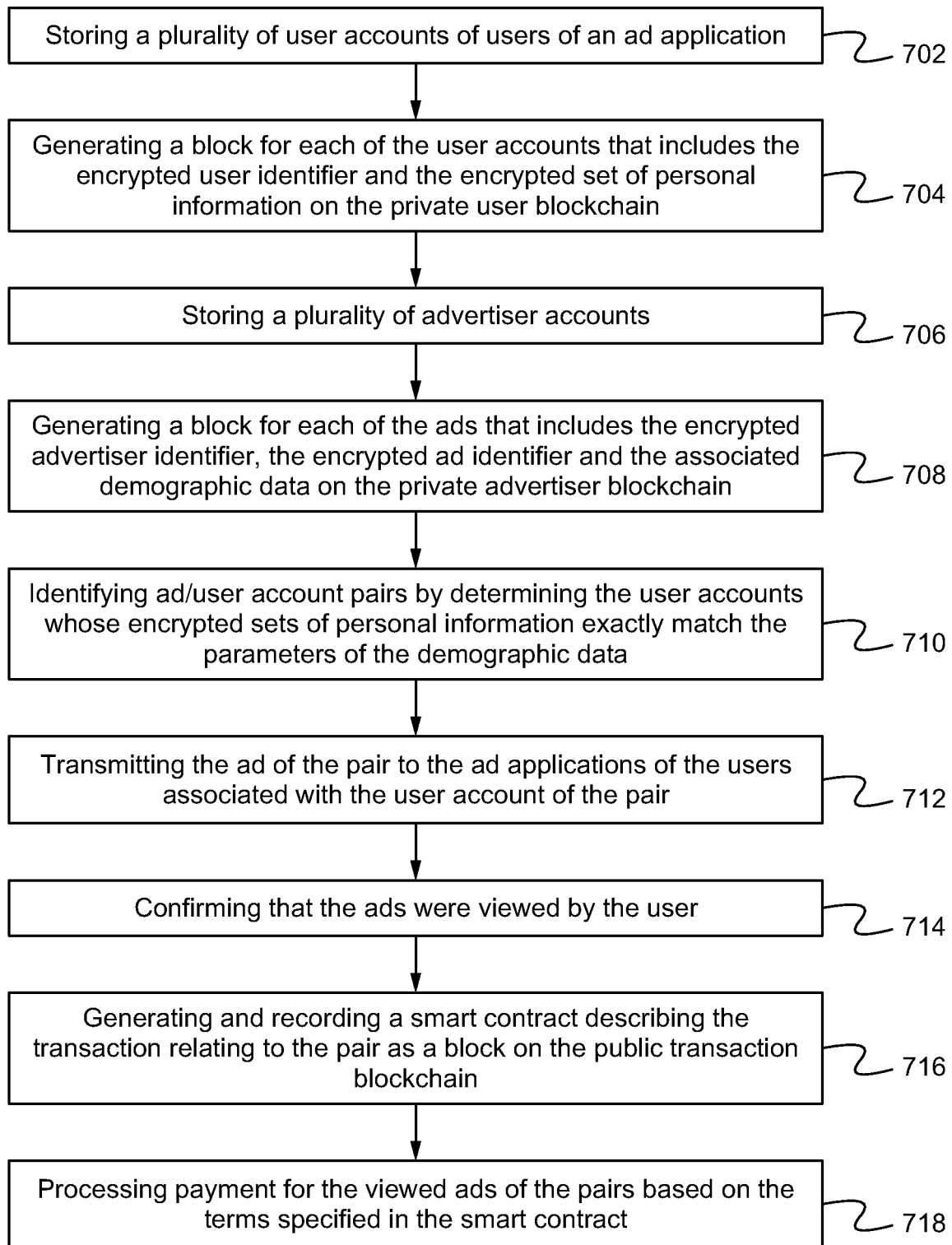
FIG. 7 illustrates a method of implementing the advertisement/media distribution system according to some embodiments.

FIG. 7 illustrates a method of implementing the advertisement/media distribution system 500 according to some embodiments. As shown in FIG. 7, the user blockchain operating system 602 stores a plurality of user accounts of users of an ad application at the step 702. In some embodiments, the user accounts each including an encrypted user identifier and an encrypted set of user personal information describing the user associated with the user account. The user blockchain operating system 602 generates a block for each of the user accounts that includes the encrypted user identifier and the encrypted set of personal information on the private user blockchain 602' at the step 704. The advertiser blockchain operating system 604 stores a plurality of advertiser accounts at the step 706. In some embodiments, each of the accounts including an encrypted advertiser identifier, one or more ads, encrypted ad identifiers that are each associated with one of the ads, and sets of demographic data that are each associated with one of the ads. The advertiser blockchain operating system 604 generates a single transaction block for each of the ads that includes the encrypted advertiser identifier, the encrypted ad identifier and the associated demographic data on the private advertiser blockchain 604' at the step 708.

The transaction blockchain operating system accesses the single transaction blocks of the private advertiser blockchain 604' and the private client blockchain 602', and for each of the ads, identifies ad/user account pairs by determining one or more of the user accounts whose encrypted sets of personal information that exactly match the parameters of the demographic data of the ad at the step 710. For each of the pairs, the transaction blockchain operating system 606 transmits the ad of the pair to the ad applications of the users associated with the user account of the pair at the step 712. The transaction blockchain operating system 606 confirms that the ads were viewed by the user at the step 714. In some embodiments, the confirmation includes receiving biometric feedback from the user that meets a specified criteria associated with the account of the user. For each of the pairs, the transaction blockchain operating system 606 generates and records a smart contract describing the transaction relating to the pair as a single transaction block on the public (or private permissioned) transaction blockchain 606' at the step 716. The transaction blockchain operating system 606 effectuates the payment for the viewed ads of the pairs based on the terms specified in the smart contract at the step 718. In some embodiments, the smart contract identifies the encrypted ad identifier of the ad, the encrypted advertiser identifier of the advertiser associated with the ad, the encrypted user identifier of the user account and transaction data. As a result, as described above, the method provides the benefit of enabling advertisers to exactly match the users that receive their ads as well as providing compensation and motivation to user to view those ads that are specifically targeted to them.

Media Production System

Figure 8:
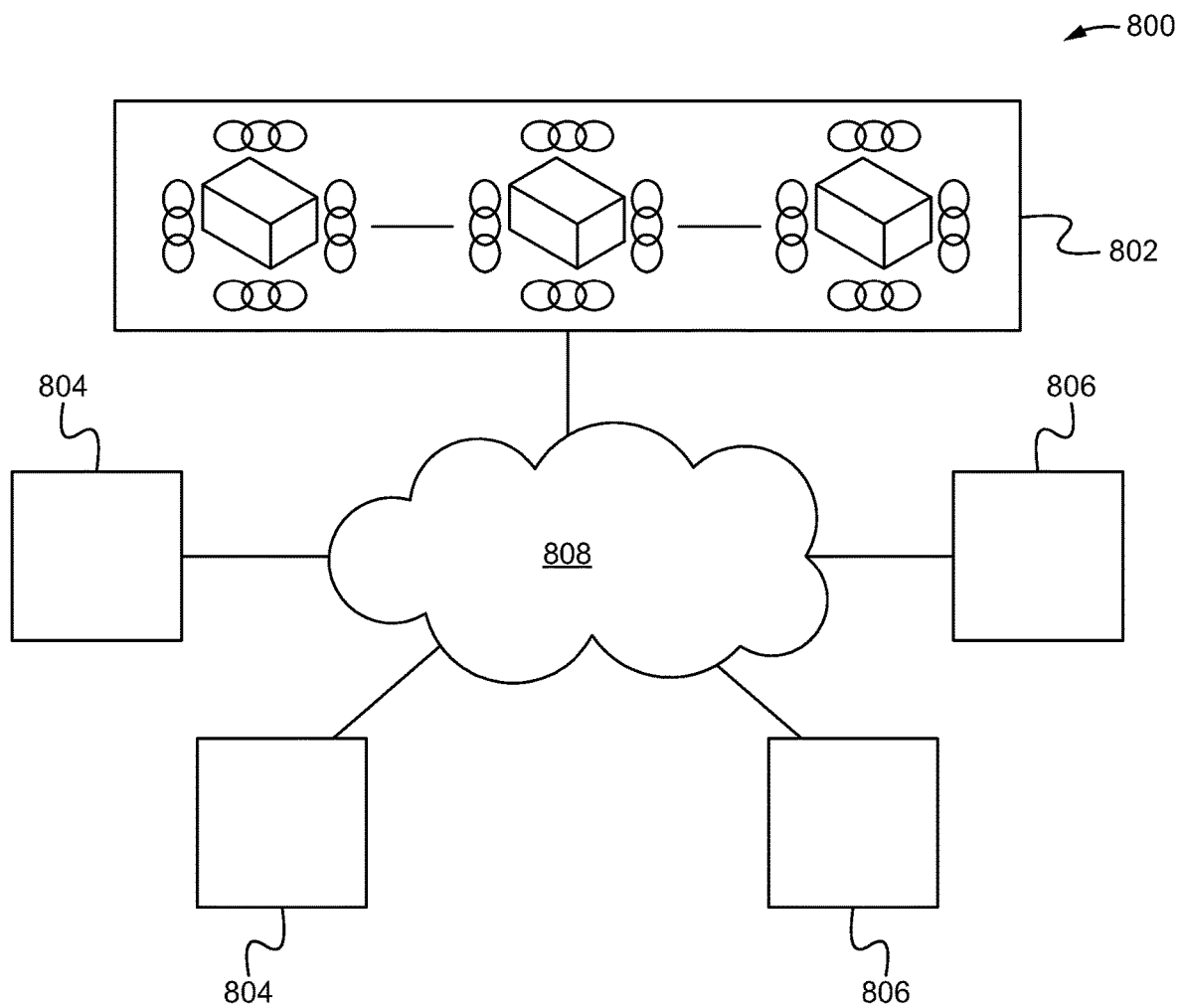
FIG. 8 illustrates a blockchain media production system according to some embodiments.

FIG. 8 illustrates a blockchain media production system 800 according to some embodiments. The system 800 is able to be substantially similar to the systems 100, 500 except for the differences described herein. As shown in FIG. 8, the system 800 comprises an production platform 802 coupled with one or more user devices 804 and one or more media producer devices 806 over one or more networks 808. The networks 808 are able to be one or a combination of wired or wireless networks as are well known in the art. Although as shown in FIG. 8 one production platform 802 is coupled with two user devices 804 and two producer devices 806, it is understood that the system 800 is able to comprise any number of platforms 802, user devices 804 and/or producer devices 806 coupled together via the network 808.

Figure 9:
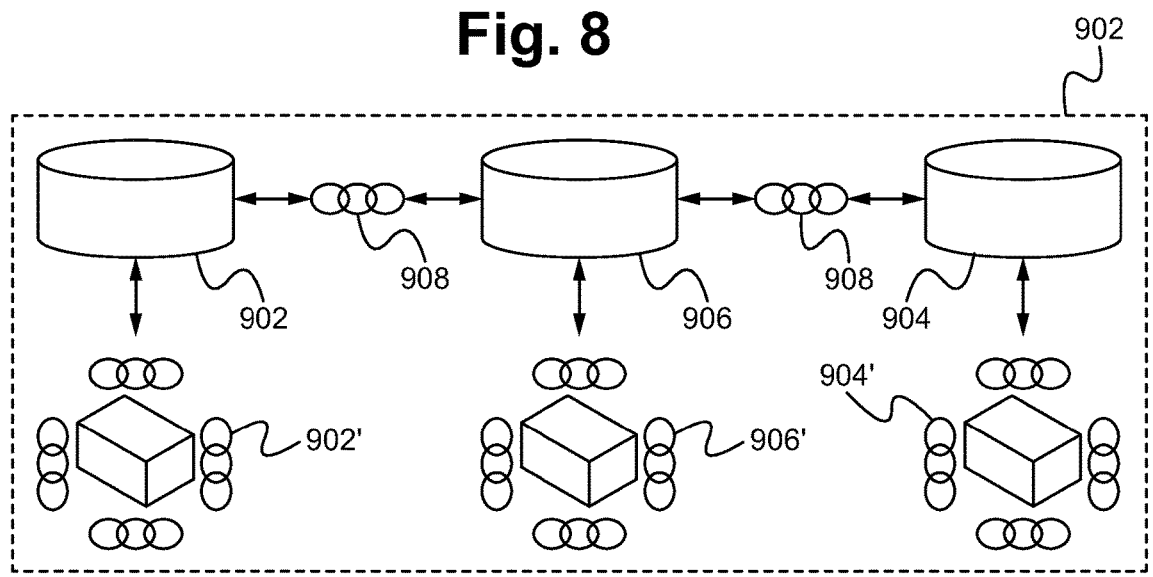
FIG. 9 illustrates a detailed view of the production platform according to some embodiments.

FIG. 9 illustrates a detailed view of the production platform 802 according to some embodiments. The production platform 802 is able to be substantially similar to the transaction and advertisement platforms 102, 502 except for the differences described herein. As shown in FIG. 9, the platform 802 comprises one or more user blockchain operating systems (e.g. residing on one or more physical servers or the cloud) 902 operating a user blockchain 902', one or more media content blockchain operating systems (e.g. residing on one or more physical servers or the cloud) 904 operating a media content blockchain 904' and a reconciliation blockchain operating systems (e.g. residing on one or more physical servers or the cloud) 906 operating a reconciliation blockchain 906'. The operating systems 902, 904, 906 (and the associated blockchains) are able to be coupled together over the network 808 (and/or a different network). In some embodiments, the platform 802 includes one or more sidechains 908 coupled between the operating systems 902, 904, 906. Specifically, the sidechains are able to be mechanisms that allow tokens and other digital assets from one blockchain to be securely used in a separate blockchain and then be moved back to the original blockchain if needed. In other words, the pegged sidechains are a blockchain that is attached to the parent chain (blockchain) through the two-way peg mechanism which allows bidirectional transfer of assets between the parent chain and the sidechain at a fixed deterministic exchange rate by using a separate token currency tied to the parent chain. In such embodiments, by using a two-way peg mechanism, the unauthorized creation of tokens and sidechains is precluded. Alternatively, the sidechains 908 are able to be omitted. The user and/or media content blockchains 902', 904' are able to be private permissioned blockchains and the reconciliation blockchain 906' is able to be a public/private hybrid blockchain (or a public blockchain). For example, the single transaction blocks of the blockchains 902', 904' are able to only be viewed by a permissioned user (e.g. having a valid account on the system 800). The operating systems 902, 904, 906 are able to be secure operating systems utilizing encryption in order to protect stored data.

In some embodiments, the blockchains 902', 904', 906' are plasma type network blockchain and smart contract platforms featuring on-chain, off-chain and/or cross-chain atomic swaps, lightning network functionality, two-way pegged sidechains and/or instant payments. In some embodiments, the smart contracts are automated smart contracts each containing a set of rules under which the users, producers, and platform have already agreed that when the rules are met (e.g. user accesses media content produced by producer), the agreement is automatically enforced. Specifically, the smart contract code facilitates, verifies and enforces the performance of that agreement and results in a transaction, and smart contract, that is saved to the reconciliation blockchain, where proportional pre-determined amounts from the proceeds of the viewing of the media content (as specified in the contract) are directed to the one or more producers, the platform and/or other entities.

The operating systems 902, 904, 906 (and/or the devices 804, 806 if the application is downloadable) include a media production application that enables the hardware of the operating systems 902, 904, 906 (and/or the devices 804, 806) to perform the functions of the system 800 described herein. In some embodiments, the user, reconciliation and/or media content operating systems 902, 904, 906 operate their portion of the application as a media production website and/or include a downloadable media production application that users are able to visit (e.g. via a web browser) and/or download onto their devices 804, 806 in order to access the features of the operating systems 902, 904, 906 described below. Specifically, the website and/or downloadable application are able to provide a user interface for receiving and responding to commands/request/input from users, receiving movies and/or other media and/or communicating data to the operating systems 902, 904, 906 via the networks 808. Additionally, the website and/or downloadable application are able to provide other functions separate from or in conjunction with the operating systems 902, 904, 906 as described in detail below.

In some embodiments, each instance of the application stored on each of the operating systems 902, 904, 906 (and/or the devices 804, 806) is able to perform all of the functions described herein. Alternatively, separate instances of the application stored on each of the operating systems 902, 904, 906 (and/or the devices 804, 806) are able to be dedicated to separate functions needed by that operating system 902, 904, 906 (and/or device 804, 806) such that they work together to perform the functions of the system 800. Although for the sake of brevity the discussion herein describes an exemplary distribution of the functions of the application on the system 800 between the operating systems 902, 904, 906 (and/or the devices 804, 806), it is understood that other function distributions are contemplated.

The application on the user blockchain operating system 902 (and/or user device 804) is able to comprise a login and registration module, an encryption module, a purchase module, a ledger module and/or a ripcord module. The application on the media content blockchain operating system 904 (and/or producer device 806) is able to comprise a login and registration module, an encryption module, a media content upload module, a ledger module and/or a ripcord module. Finally, the application on the reconciliation blockchain operating system 906 is able to comprise a request/query module, a payment processing module, a security module, a reconciliation module and/or a dispute module.

The producer and user login and registration modules both enable a user (i.e. user/producer) to create an account on the transaction system 800 by inputting username and password information, a native identifier (e.g. name), personal information about the user, contact information (e.g. phone number, email) and/or banking information (i.e. for depositing money from another account into the user's account on the system 800 and vice versa) via a graphical user interface (e.g. of a website and/or transaction application). In some embodiments, the personal information includes biometric data (iris scan, voice recording, fingerprint scan, etc.) for implementing biometric verification as described in detail below. In some embodiments, the personal information is able to be omitted for the producer login and registration module. This account information is then associated with a newly generated account such that the information is able to be used to identify the user when logging onto the system 800 and other functions of the system 800. The personal information is able to comprise one or more of the account owner's age, gender, address, income level, religion, political affiliation, race, nationality, interests, height, hair color, eye color, weight, medical conditions, family members, education level, degrees earned, occupation and/or other characteristics of the user. The username, password and personal information are able to be stored on an account database (e.g. on the operating systems 902, 904) or another network accessible location.

After the account is created, the user is able to access the account and any associated data (e.g. to edit the personal data) by entering the username and password in order to identify themselves to the system 800.

Once an account is registered, the encryption module for both the producer and user operating systems 902, 904 inputs the data associated with the account, issues one or more encryption keys and generates a unique user/producer identifier (e.g. alpha-numeric identifier) for the user/account. Subsequently, the module encrypts both the unique user/producer identifier and the personal information associated with the account. The encryption keys are able to be used by the users/producers to digitally sign transactions/smart contracts in order to effectuate the transactions on the system. In some embodiments, the encryption keys are multi-blade, multi-key post quantum signature protocol keys. In some embodiments, the keys work for single user, multi-use, single signature and multi-signature operations. In some embodiments, the keys are reliant only on hash functions and do not require special math theory.

In some embodiments, the encryption module enables the user and/or producer devices 804, 806 to store their encryption keys and only allow those keys to be accessed with one or more of a password (e.g. submitted to the platform by the user) and/or one or more secondary biometric validators (e.g. facial recognition, fingerprint recognition, voice recognition, iris recognition). The password and/or biometric data (e.g. facial data, fingerprint data, voice data, iris data) that is used for each account is able to be inputted by the platform during the registration process and stored and associated with the account (as a part of the account data). For example, in such embodiments when a user wants to make a purchase using the platform, the platform is able to automatically request submission of the password and/or biometric data before retrieving the keys and initiating the request for the transaction. Additionally, this allows the devices 804, 806 to not only be used as off-chain key storage, but also as a token wallet wherein if lost or stolen all value is able to be restored when a new/replacement device's biometrics and/or password confirm that it is again in the rightful owner's possession (and any tokens or keys on lost/stolen devices 804, 806 are able to be invalidated remotely).

The user and producer ledger modules then add the encrypted account data to the user/producer blockchains 902', 904' as a new single transaction block including an account balance value. If the user/producer has made or has yet to make a deposit when the account is initially created, the account balance recorded on the initial block for that account will indicate the value of that initial deposit. Subsequently, as described below, each deposit into or withdrawal from the system 800 (e.g. due to a transaction, user/producer deposit or withdrawal) for the account will be reflected in a new single transaction block on the user/producer blockchain 902', 904' generated and posted by the user/producer ledger module that reflects the updated balance for that account. Additionally, as describe below, when account balance corrections are required (e.g. because of transactions that were posted but then found to be invalid by the security module), the ledger modules automatically update/correct the account balances on the blockchains 902', 904' by posting "correction" blocks that correct the account balance as necessary. In some embodiments, the user and producer ledger modules post, update and maintain separate ledgers for deposits, withdrawals, and the running account balance on the user and producer blockchains 902', 904'. As a result, each user account will have three associated ledgers of blocks, one indicating each subsequent deposit, one indicating each subsequent withdrawal and one indicating the running balance (as changed by the deposits and withdrawals).

In some embodiments, the account balances of the user and producer accounts are made up of a virtual currency or coin issued by the system 800 and any payments within the system 800 are made using the virtual currency. In some embodiments, the virtual currency comprises continuous "mint and burn" tokens/coins. Specifically, as more producer and/or users register on the system, the system is able to issue/mint new tokens for any deposited money and burn tokens as they are redeemed for their monetary value. In particular, the operating systems are able to record a smart contract on the user and/or producer blockchains evidencing the redeeming of the tokens and identifying the coins as burned such that they cannot be reused.

On the producer blockchain operating system 904, the media content upload module inputs media content information (e.g. description, ticket prices (ownership and/or rental), income/profit distribution scheme among producers and/or system and/or other media content details) that the producer wishes to provide for investment/purchase on the system 904. In some embodiments, the upload module provides a unique identifier for each of the media content. Upon submission of the media content information, the upload module generates a smart contract that reflects the indicated parameters of the investment/purchase of the media content along with the encrypted producer unique identifier(s) and/or the media content identifier. The upload module then adds this smart contract and the identifier(s) as a single transaction block for each media content on the producer blockchain 904'. Thus, the information stored on the producer/user blockchains 902', 904' is fully de-identified such that it is not connectable to any natural user identification information. In some embodiments, if the associated media content itself (e.g. movie) has already been created, the media content itself is able to be uploaded at the same time and added to the blockchain 904' along with the other data as a single transaction block. If not, the media content is able to be uploaded later in a block linked to the previously uploaded data. Alternatively, the media content itself is able to be stored separately (e.g. on the producer blockchain operating system 904 and/or another storage) from the blockchain 904' along with the media content unique identifier. In such embodiments, when accessing the media content the reconciliation blockchain operating system 906 is able to access where the media content is stored and lookup which media content is needed based on the media content unique identifier.

If the uploaded media content information is for a pre-order, the reconciliation blockchain operating system 906 and/or the media content blockchain operating system 904 are able to create a pre-order token for that media content to be issued to users who pre-order the media content. This token is unique to the media content and is only able to be used to access the media content if/when it is made available on the system 800. Any number of tokens are able to be issued and upon use, or if the media content is not made, the tokens are able to be burned. In some embodiments, If the uploaded media content information is for a pre-order, the reconciliation blockchain operating system 906 and/or the media content blockchain operating system 904 are able to create a sidechain 908 coupled to the reconciliation blockchain 906', the user blockchain 902' and/or the content blockchain 904'. This sidechain 908 is dedicated to that media content pre-order and is able to record the pre-order tokens issued for the media content. Additionally, as described below, the sidechain 908 is able to be used to effectuate the payment for the pre-order when/if the content is made available between the blockchains 902', 904', and/or 906'.

The purchase module of the user blockchain operating system 902 enables a user to view and purchase or pre-order one or more of a list of media content that have been provided for purchase and/or pre-order by the producers via the associated smart contract on a block on the producers blockchain 904'. Specifically, the media content presented are able to reflect the terms of the media content information indicated in the open smart contracts for the media content created by the producers and stored on the producer blockchain 904' such that the users are able to choose whether they agree to those terms and to complete the smart contract (e.g. pay X to purchase/rent content now, commit to automatically paying X at release of content as a pre-order of the content). In some embodiments, the purchase module automatically notifies the user of a selected subset of the media content when it becomes available on the system 800. Specifically, like in the system 500 described above, the reconciliation blockchain operating system 906 is able to include a matching module and the media information is able to include target demographic data such that when the target demographic data matches the personal information of a user, the reconciliation blockchain operating system 906 is able to automatically present those matching subset of the media content purchase/pre-orders to that matching user (e.g. on the user device 804).

Once a user submits a purchase and/or pre-order command to the purchase module (e.g. via a user device 804), the module generates and transmits a purchase and/or pre-order request to the reconciliation blockchain operating system 906' including one or more of the encrypted user unique identifier, the unique media content identifier of the media content to be purchased/pre-ordered, the producer unique identifier(s) (associated with the media content) and/or one or more user encryption keys of the account.

The request/query module of the reconciliation blockchain operating system 906 receives these requests and uses the unique media content identifier and/or the producer unique identifier to query the producer blockchain operating system 904 for the associated smart contract on the producer blockchain 904'. The producer blockchain operating system 904 fetches the contract information of the associated smart contract from the producer blockchain 904' and transmits the contract information to the reconciliation blockchain operating system 906. In some embodiments, the request/query module then is able to send confirmation request to the user device 804 (e.g. using the contact information included during the registration of the user/producer accounts). In some embodiments, the confirmation requests comprise a challenge message that needs to be digitally signed by the user device 804, using their user encrypted keys. These digital signatures are able to later be validated by reconciliation blockchain operating system 906 (e.g. using the associated paired keys known by the reconciliation blockchain operating system 906) as a part of determining if there is consensus for the transaction as described below. Alternatively, the confirmation request is able to be omitted and/or is able to be included as a part of the initial purchase/pres-order message.

Subsequently, if the request was a purchase request (not a pre-order), the payment processing module processes the payment as indicated in the smart contract. Specifically, the module requests/receives from the user blockchain operating system 902 money/tokens from the account associated with the user identifier equal to the price indicated in the smart contract, and transfers the money/tokens to the owed parties (e.g. the account of the producer identifier and/or the system fee account). In some embodiments, the payment module performs the payment processing using the sidechain 908 created for the media content as the method of transferring the money/tokens from the user account on the user blockchain 902' to the producer account(s) on the media content blockchain 904'. In some embodiments, the payment processing module ensures that all tokens/monies remain within the control of the reconciliation blockchain operating system 906 and/or a central authority until a physical withdrawal is effectuated by a user. In some embodiments, if users effectuate a payment method other than from a pre-existing balance from the user's system account (e.g. via a 3rd-party credit card), the payment processing module is able to still processes the payment in parallel with the validation of the transaction. If one or more tokens are stolen from a user and/or producer account, because all users are known, the user and/or producer operating systems 902, 904 are able to trace the tokens and record on the reconciliation blockchain 906' that the tokens are no longer valid as well as replacing the stolen tokens in the account with newly minted tokens.

The ledger modules of the producer and user operating systems 902, 904 each post a new single transaction block indicating the adjustment to the existing account balance to the producer/user accounts on the producer and user blockchains 902', 904', respectively. Each of these transactions is added to the blockchains 902', 904' as a single transaction block (rather than multiple transactions on a single block) such that if there is a dispute or error, the single transaction block having the error is able to be corrected by a new updated single transaction block added to the chains 902', 904'. For example, a fraudulent charge indicated in a first block on the user blockchain 902' is able to be corrected by a subsequent updated single transaction block crediting the charged amount back to the account (thereby correcting the indicated account total). This would not be possible if a single block was used for multiple transactions because the fraudulent transaction could not be corrected without also affecting all the other non-fraudulent transactions on the block also compromising the immutability of that blockchain.

If instead the request was a pre-order request, the payment processing module of the reconciliation blockchain operating system 906 issues to the user one of the pre-order tokens generated for the media content during the upload process (e.g. a token of the sidechain 908 created for the media content) and stores the user identifier in a pre-order database for the media content (e.g. as separate single transaction blocks on one or more of the blockchains 902', 904', 906', the sidechain 908 for that media content, one or more of the operating systems 902, 904, 906 and/or another storage database) such that all of the users who pre-order the media content are able to be identified from the pre-order database. In some embodiments, the sidechain 908 is able to be used as the pre-order database, wherein the sidechain record indicating that the user identifier is the current owner of the token is able to prove that the user pre-ordered the media content. The reconciliation blockchain operating system 906 is then able to wait until the pre-ordered media content is created and made available on the system 800 (as described above), identify all the user accounts that pre-ordered the content (via the pre-order database) and automatically process the payment indicated in the smart contract of that pre-ordered media content at that time (in the same manner as the purchases as described above). If the media content is not made within a specified time period (e.g. as specified within the smart contract/media content information) the reconciliation blockchain operating system 906 is able to notify the users and burn the pre-order tokens without any money having been transferred. Alternatively, pre-orders are able to be processed once the pre-order is made and then the money refunded if the content is not produced within a specified time frame. As a result, the system 800 provides the advantage of enabling users to invest (via pre-orders) in media content that they want to be made thereby increasing the likelihood it gets made and giving content producers more information about what and how to make media content.

At the same time (e.g. before, simultaneously or concurrently), the reconciliation module effectuates the delivery and posting of the transaction. Specifically, upon receipt/processing of the payment for a purchase or upon receipt and burning of a pre-order token (with the payment having been processed when the content was made available) for a pre-order, the reconciliation module digitally delivers the media content to the user (e.g. user device 804). Further, the reconciliation module generates and notarizes and posts as a single transaction block on the reconciliation blockchain 906' a new final smart contract indicating the completion of the transaction. The blocks are able to be time-stamped, posted ordered and validated in real-time. In particular, unlike other blockchain systems, the reconciliation module posts the single transaction block without first waiting for a full node consensus that the transaction is valid (e.g. not fraudulent). This enables the system 800 to post transactions faster than any existing blockchain system resulting in greater throughput and efficiency of the system 800. The posted block is able to indicate the terms of the transaction (e.g. price, date, payment, and/or other transaction data), as well as the producer and user encrypted unique identifiers (and/or the media content identifier). Additionally, because like the producer/user blockchains 902', 904' (and unlike other blockchain systems), the contract is posted as a single transaction block on the reconciliation blockchain 906', the transactions are able to be later corrected by adding a new update single transaction block to the blockchain 906' that indicates any necessary modifications to the original block.

Also at the same time (e.g. before, simultaneously or concurrently), the security module performs a proof of transaction consensus process on the transaction in order to validate the transaction is not fraudulent or otherwise invalid. In some embodiments, the security module performs the proof of transaction consensus process by verifying that the user encryption keys submitted by the user blockchain operating system 902 are valid keys that are associated with the encrypted user identifier using a hash verification of the keys. In some embodiments, the security module includes artificial intelligence in order to aid in the speedy determination of consensus of each of the transactions. In some embodiments, the security module generates and issues automatic reusable encryption keys for the users and producers if they did not have pre-existing encryption keys. If the proof of transaction fails, the security module notifies the reconciliation module and the user/producer ledger modules so the reconciliation module is able to post a new single transaction block correcting (e.g. nullifying) the transaction on the reconciliation blockchain 906' and the ledger modules are able to similarly post new single transaction block s correcting the account balances of the producer and user on the producer/user blockchains 902', 904'.

The dispute module receives transaction disputes from users and/or producers and resolves the disputes even after the single transaction block of the transaction has been posted to the reconciliation blockchain 906' without compromising immutability of the blockchain 906'. Specifically, the dispute module operates as the central authority by determining if the smart contract conditions were met (e.g. payment made, media content delivered) and adjudicates disputes and determine resolution adjustments (if necessary) to the disputed transaction. Upon determination of the resolution of the dispute, if necessary, the reconciliation module, the user ledger module and/or the producer ledger module each post a new single transaction block to their associated blockchains 902', 904', 906' tied to the previously posted block (and any "family") for the transaction reflecting the dispute results and thereby correcting any previously posted block reflecting the disputed transaction. In particular, the reconciliation module of the reconciliation blockchain operating system 906 is able to receive the dispute results and share those results with the user and producer operating systems 902, 904 such that each of the operating systems 902, 904, 906 are able to appropriately adjust their associated blockchains 902', 904', 906' based on the dispute results.

As a result, related transactions (original blocks and subsequent corrections) are able to be readily grouped by and easily viewed on the chains 902', 904', 906' as a "family" of blocks all related to the same transaction. Thus, the dispute module provides the benefit of being able to effectuate reconciliation of a dispute within the system 800 without compromising the immutability of the blockchains 902', 904', 906'. Thus, the reconciliation blockchain operating system 906 and/or reconciliation blockchain 906' provide the benefit of being able to run transaction processing, validation and posting of ordered single transaction blocks in real-time (e.g. posting before consensus is complete) as well as providing dispute resolution in order to correct errors and/or fraudulent charges. In some embodiments, the dispute module includes a loss mitigation function (e.g. powered by artificial intelligence and/or machine learning) that monitors transactions submitted to the reconciliation blockchain operating system 906 and identifies and stops suspicious transactions from being completed (e.g. from being recorded on the blockchains at all).

Additionally at any time the user/producer ripcord modules enable the users/producer to exercise their "right to be forgotten" under the general data protection regulation (GDPR) and leave the system 800. Specifically, upon receiving a removal command from a user and/or producer the ripcord modules automatically delete the native user information stored on the user/producer operating systems 902, 904. As a result, once this native user information is removed, the encrypted data that remains on the blockchains 902', 904' and/or 906' can no longer be linked to the user (user/producer). Thus, the system 800 provides the benefit of being GDPR compliant while maintaining the benefits of the blockchains' immutability.

Accordingly, the system 800 provides the advantages of providing users with a voice and choice as to what media content (e.g. movies) are funded, made and distributed as well as anonymously providing important feedback and user data to producers on a granular level. Further, profits are able to be dynamically distributed for every purchase in real-time instead of waiting for production company accounting and other delays.

Figure 10:
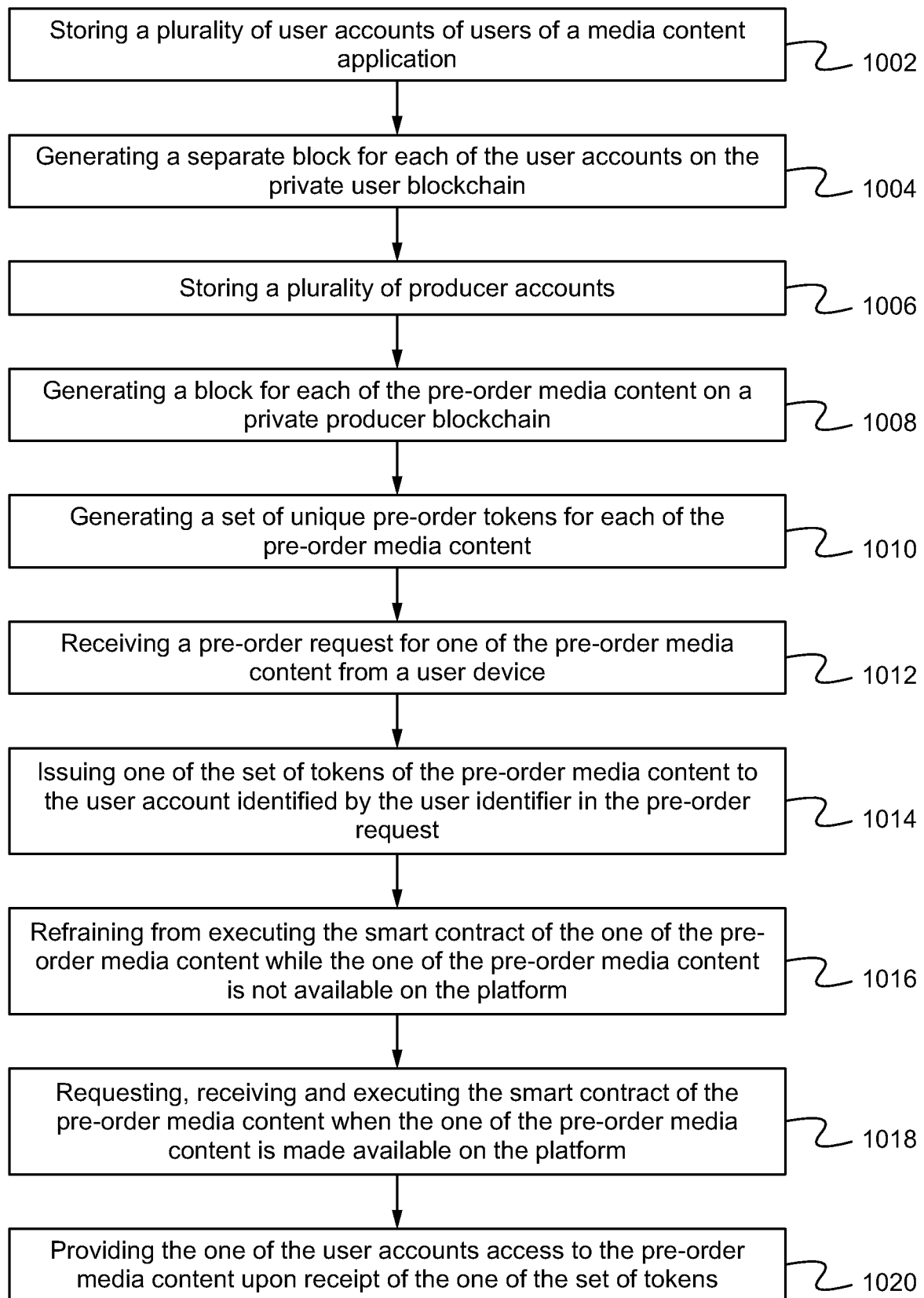
FIG. 10 illustrates a method of distributing media content between a user and a producer in blockchain media distribution system according to some embodiments.

FIG. 10 illustrates a method of distributing media content between a user and a producer in blockchain media distribution system 800 according to some embodiments. As shown in FIG. 10, the user blockchain operating system 902 stores a plurality of user accounts of users of a media content application at the step 1002. In some embodiments, the user accounts each include a user identifier. The user blockchain operating system 902 generates a separate single transaction block for each of the user accounts on the private user blockchain 902' at the step 1004. In some embodiments, the separate single transaction block includes encrypted forms of the user identifier and an account balance indicating a current value of the user account. The producer blockchain operating system 904 stores a plurality of producer accounts at the step 1006. In some embodiments, the producer accounts each include a producer identifier and pre-order media content information describing pre-order media content that is not yet available on the platform. In some embodiments, the pre-order media content information includes one or more pre-order media content identifiers of the pre-order media content for production by the producer account and parameters of pre-order media content offers associated with each of the pre-order media content. The producer blockchain operating system 904 generates a block for each of the pre-order media content on a private producer blockchain 904' at the step 1008. In some embodiments, the single transaction block includes an encrypted form of the pre-order media content identifier of that pre-order media content and a smart contract configured to enforce the parameters of the pre-order media content offer of that pre-order media content.

The reconciliation blockchain operating system 906 generates a set of unique pre-order tokens for each of the pre-order media content at the step 1010. The reconciliation blockchain operating system 906 receives a pre-order request for one of the pre-order media content from a user device 804 at the step 1012. In some embodiments, the pre-order request includes the pre-order media content identifier of the one of the pre-order media content and the user identifier of one of the user accounts. The reconciliation blockchain operating system 906 issues one of the set of tokens of the pre-order media content identified by the pre-order media content identifier in the pre-order request to the user account identified by the user identifier in the pre-order request at the step 1014. The reconciliation blockchain operating system 906 refrains from executing the smart contract of the one of the pre-order media content while the one of the pre-order media content is not available on the platform 802 at the step 1016. The reconciliation blockchain operating system 906 requests, receives and executes the smart contract of the one of the pre-order media content from the producer blockchain operating system 904 in order to complete the transaction when the one of the pre-order media content is made available on the platform at the step 1018. The reconciliation blockchain operating system 906 provides the one of the user accounts access to the pre-order media content upon receipt of the one of the set of tokens at the step 1020. As a result, the method provides the advantage of enabling the production of media content to be based on actual user excitement and desire for the media content to be produced while also providing a level of certainty to production companies that the media content will at least produce a baseline of income.

In some embodiments, the reconciliation blockchain operating system 906 generates a sidechain coupled to the distribution blockchain 906' for each of the pre-order media content. In some embodiments, the set of unique pre-order tokens for the pre-order media content are tokens from the sidechain generated for that one of the pre-order media content. As a result, this sidechain and the tokens thereof are able to be used for determining the user desire for such media content. In such embodiments, issuing the one of the set of tokens to the user account is able to comprise recording the user identifier of the user account on the sidechain of the one of the pre-order media content in paired with an token identifier of the one of the set of tokens. In some embodiments, the one of the pre-order media is made available on the platform by being uploaded on the producer blockchain operating system via the producer account associated with the pre-order media content. In some embodiments, the reconciliation blockchain operating system 906 generates and posts a single transaction block on the distribution blockchain 906' before full node consensus for a transaction caused by executing the smart contract has been determined, the single transaction block including transaction data describing the transaction.

In some embodiments, the producer blockchain operating system 904 generates a separate single transaction block for each of the producer accounts on the producer blockchain 904', the separate single transaction block including encrypted forms of the producer identifier and an account balance indicating a current value of the producer account. In some embodiments, executing the smart contract includes transferring an amount of money indicated in the smart contract from the user account identified by the user identifier in the request to the producer account associated with the smart contract. In some embodiments, when the smart contract is executed, the user blockchain operating system 902 posts a new single transaction block to the user blockchain that changes the account balance of the one of the user accounts based on the transaction details, and the producer blockchain operating system 904 posts a new single transaction block to the producer blockchain that changes the account balance of one of the producer accounts associated with the pre-order media content identifier based on the transaction data.

Exemplary Device

Figure 4:
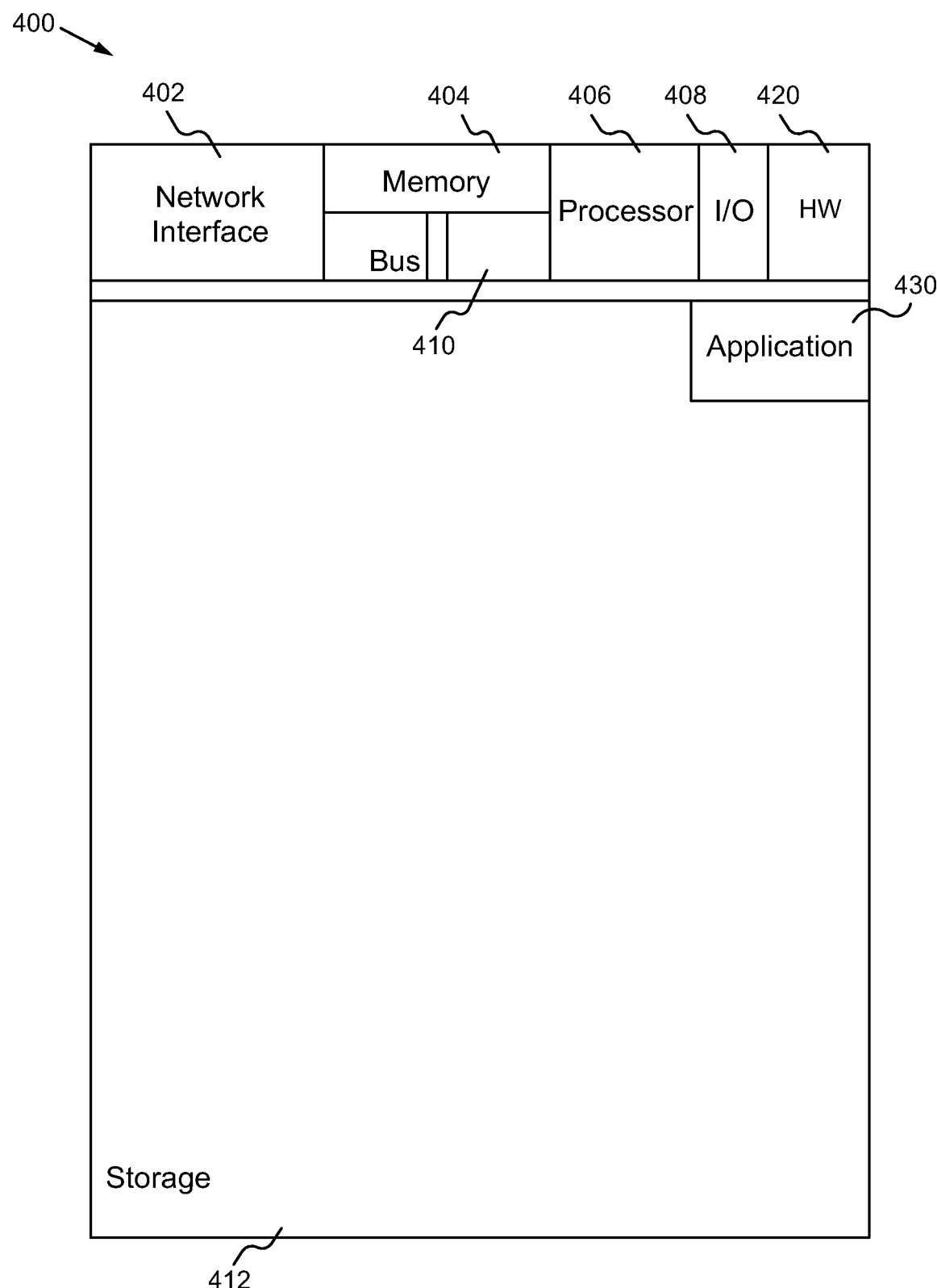
FIG. 4 illustrates a block diagram of an exemplary computing device according to some embodiments.

FIG. 4 illustrates a block diagram of an exemplary computing device 400 according to some embodiments. The computing device 400 is able to be one or more of the operating systems 202, 204, 206, 602, 604, 606, 902, 904, 906 devices 104, 106, 504, 506, 804, 806 and/or the blockchains 202', 204', 206', 602', 604', 606', 902', 904', 906'. In general, a hardware structure suitable for implementing the computing device 400 includes a network interface 402, a memory 404, a processor 406, I/O device(s) 408, a bus 410 and a storage device 412. Alternatively, one or more of the illustrated components are able to be removed or substituted for other components well known in the art. The choice of processor is not critical as long as a suitable processor with sufficient speed is chosen. The memory 404 is able to be any conventional computer memory known in the art. The storage device 412 is able to include a hard drive, RAM, SRAM, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. The operating system module(s) 430 used to operate the platform are likely to be stored in the storage device 412 and memory 204 and processed as applications are typically processed. More or less components shown in FIG. 4 are able to be included in the computing device 400. In some embodiments, hardware 420 is included. Although the computing device 400 in FIG. 4 includes software 430 and hardware 420, the features of the system 100 are able to be implemented on the computing device 400 in hardware, firmware, software or any combination thereof. Examples of suitable computing devices include a personal computer, a laptop computer, a computer workstation, a server, a datacenter, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television, a home entertainment system or any other suitable computing device.

The system 100, 500 described herein have numerous advantages. In particular, the system 100, 500 provides the advantage of enabling a high throughput of transactions recorded on the central public/private hybrid blockchain, or a central private permissioned blockchain, without sacrificing the immutability of the blockchain by utilizing a posting of transactions with a proof of transaction consensus before any full node consensus protocol combined with using separate single transaction blocks for each transaction such that errors can be corrected with subsequent blocks. Further, it provides the advantage of enabling ads to be targeted on a granular level to specific users, providing confirmation of the viewing of those ads, providing compensation to the users and providing dynamic real-time data analytics about the ads and user responses to the ads. Further, the system 100, 500 enables the users to remain in complete control of their personal data without disrupting the immutability of the notary/transaction blockchain by including a ripcord feature that de-identifies and/or anonymizes any user who wishes to discontinue using the service.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention. For example, in some embodiments the application includes a deadbolt function that provides real-time feedback on the smart contracts that the blockchain operating system generates as well as providing alerts on suspicious activity in order to prevent the activity from taking place.

Also, although as described herein, a single seller/advertiser/content creator is associated with each product/advertisement/content, it is understood that multiple entities each having a different unique identifier and account are able to be associated with single products/advertisements/content, wherein the additional entities are recorded, payed and treated in the same manner as the single entity as described. In some embodiments, the transfer of tokens and/or other moneys described herein between the operating systems/blockchains (e.g. for effectuating payments and/or issuing pre-order tokens) is effectuated used the pegged sidechains 208, 608, 908 as a method of transferring the tokens between the blockchains/operating systems. As used herein, a user, buyer, seller, advertiser and/or producer is able to be any entity (e.g. person, business, fund, government entity) that is able to be due compensation on the system 100, 500, 800 (e.g. for a transaction, a viewing of an advertisement, viewing of media content and/or other feature). Specifically, even if they are not a part of the upload, purchase and/or viewing process, the entities are able to have accounts on the system such that the system is able to compensate them as necessary (e.g. as indicated in the smart contracts).

What is claimed is:

1. A blockchain transaction platform for executing transactions between a buyer and a seller, the platform comprising:
   at least one buyer blockchain operating system storing a plurality of buyer accounts of users of a transaction application, the buyer accounts each including a buyer identifier and a set of buyer encrypted keys associated with the buyer account;
   a private buyer blockchain that includes a separate single transaction block for each of the buyer accounts that includes encrypted forms of the buyer identifier and an account balance indicating a current value of the buyer account;
   at least one seller blockchain operating system storing a plurality of seller accounts each including a seller identifier, a set of seller encrypted keys associated with the seller account and sales information, the sales information including one or more product identifiers of products for sale by the seller account and parameters of sales offers associated with each of the products;
   a private seller blockchain that includes a block for each of the products that includes an encrypted form of the product identifier of that product and a smart contract configured to enforce the parameters of the sales offer of that product;
   a notary blockchain that includes a separate single transaction block storing details of each transaction between any one of the buyer accounts and any one of the seller accounts such that only one of the transactions is stored on each of the blocks of the notary blockchain; and
   at least one notary blockchain operating system including a transaction engine configured to:
      receive a transaction request for a transaction from a buyer device, the transaction request including the product identifier of one of the products and the buyer identifier of one of the buyer accounts;
      request, receive and execute the smart contract of the one of the products from the seller blockchain operating system in order to complete the transaction; and
      generate and post a single transaction block on the notary blockchain before full node consensus for the transaction has been determined, the single transaction block including transaction data describing the transaction.

2. The blockchain transaction platform of claim 1, wherein the private seller blockchain includes a separate single transaction block for each of the seller accounts that includes encrypted forms of the seller identifier and an account balance indicating a current value held in the seller account.

3. The blockchain transaction platform of claim 2, wherein the notary blockchain operating system executes the smart contract by transferring an amount of currency indicated in the smart contract from the buyer account identified by the buyer identifier in the request to the seller account associated with the smart contract.

4. The blockchain transaction platform of claim 3, wherein when the smart contract is executed, the buyer blockchain operating system posts a new single transaction block to the buyer blockchain that changes the account balance of the one of the buyer accounts based on the transaction details, and the seller blockchain operating system posts a new single transaction block to the seller blockchain that changes the account balance of one of the seller accounts associated with the product identifier based on the transaction details.

5. The blockchain transaction platform of claim 4, wherein the notary blockchain operating system includes a dispute resolution function that settles disputed transactions and produces a settlement summary that indicates how the disputed transaction should be adjusted.

6. The blockchain transaction platform of claim 5, wherein the notary blockchain operating system generates and posts a single updated transaction block on the notary blockchain based on the settlement summary, the single updated transaction block including transaction data describing the adjustments to the disputed transaction indicated in the settlement summary.

7. The blockchain transaction platform of claim 6, wherein when the notary blockchain operating system generates and posts a single updated transaction block on the notary blockchain based on the settlement summary, for each of the buyer accounts whose account balance is changed by the settlement summary, the buyer blockchain operating system posts a new single updated transaction block to the buyer blockchain that changes the account balance of the buyer accounts based on the settlement summary, and for each of the seller accounts whose account balance is changed by the settlement summary, the seller blockchain operating system posts a new single updated transaction block to the seller blockchain that changes the account balance of the seller accounts based on the settlement summary.

8. The blockchain transaction platform of claim 7, wherein the request includes the buyer keys of the one of the buyer accounts and the transaction engine is configured to determining consensus for the transaction after the single transaction block is posted to the notary blockchain by validating whether the buyer keys of the transaction request are authentic.

9. The blockchain transaction platform of claim 8, wherein the buyer keys are stored on the buyer device and the buyer blockchain operating system prevents use of the buyer keys in the transaction request unless a user of the buyer device passes a biometric verification test.

10. The blockchain transaction platform of claim 9, wherein the biometric verification test includes inputting biometric data from the user comprising one or more of a face image, a retinal image, a fingerprint and a voice signal and determining if the inputted biometric data matches stored reference biometric data associated with the buyer account.

11. The blockchain transaction platform of claim 10, wherein the transaction data includes one or more of the seller identifier, the buyer identifier, the product identifier, a price of the product and a time of the transaction, a value of currency paid to the seller identified by the seller identifier and a percentage of the value owed to the notary blockchain operating system.

12. The blockchain transaction platform of claim 11, wherein upon receiving a ripcord command from a buyer device associated with one of the buyer accounts, the buyer blockchain operating system is configured to delete the buyer identifier associated with the buyer account.

13. A blockchain transaction system of a blockchain transaction platform for executing transactions between a buyer and a seller, the platform including at least one buyer blockchain operating system storing a plurality of buyer accounts of users of a transaction application, the buyer accounts each including a buyer identifier and a set of buyer encrypted keys associated with the buyer account, a private buyer blockchain that includes a separate single transaction block for each of the buyer accounts that includes encrypted forms of the buyer identifier and an account balance indicating a current value of the buyer account, at least one seller blockchain operating system storing a plurality of seller accounts each including a seller identifier, a set of seller encrypted keys associated with the seller account and sales information, the sales information including one or more product identifiers of products for sale by the seller account and parameters of sales offers associated with each of the products and a private seller blockchain that includes a block for each of the products that includes an encrypted form of the product identifier of that product and a smart contract configured to enforce the parameters of the sales offer of that product, the system comprising:
  a public notary blockchain that includes a separate single transaction block storing details of each transaction between any one of the buyer accounts and any one of the seller accounts such that only one of the transactions is stored on each of the blocks of the notary blockchain; and
  at least one notary blockchain operating system including a transaction engine configured to:
    receive a transaction request for a transaction from a buyer device, the transaction request including the product identifier of one of the products and the buyer identifier of one of the buyer accounts;
    request, receive and execute the smart contract of the one of the products from the seller blockchain operating system in order to complete the transaction; and
    generate and post a single transaction block on the notary blockchain before consensus for the transaction has been determined, the single transaction block including transaction data describing the transaction.

14. The blockchain transaction system of claim 13, wherein the private seller blockchain includes a separate single transaction block for each of the seller accounts that includes encrypted forms of the seller identifier and an account balance indicating a current value held in the seller account.

15. The blockchain transaction system of claim 14, wherein the notary blockchain operating system executes the smart contract by transferring an amount of currency indicated in the smart contract from the buyer account identified by the buyer identifier in the request to the seller account associated with the smart contract.

16. The blockchain transaction system of claim 15, wherein when the smart contract is executed, the buyer blockchain operating system posts a new single transaction block to the buyer blockchain that changes the account balance of the one of the buyer accounts based on the transaction details, and the seller blockchain operating system posts a new single transaction block to the seller blockchain that changes the account balance of one of the seller accounts associated with the product identifier based on the transaction details.

17. The blockchain transaction system of claim 16, wherein the notary blockchain operating system includes a dispute resolution function that settles disputed transactions and produces a settlement summary that indicates how the disputed transaction should be adjusted.

18. The blockchain transaction system of claim 17, wherein the notary blockchain operating system generates and posts a single updated transaction block on the notary blockchain based on the settlement summary, the single updated transaction block including transaction data describing the adjustments to the disputed transaction indicated in the settlement summary.

19. The blockchain transaction system of claim 18, wherein when the notary blockchain operating system generates and posts a single updated transaction block on the notary blockchain based on the settlement summary, for each of the buyer accounts whose account balance is changed by the settlement summary, the buyer blockchain operating system posts a new single updated transaction block to the buyer blockchain that changes the account balance of the buyer accounts based on the settlement summary, and for each of the seller accounts whose account balance is changed by the settlement summary, the seller blockchain operating system posts a new single updated transaction block to the seller blockchain that changes the account balance of the seller accounts based on the settlement summary.

20. The blockchain transaction system of claim 19, wherein the request includes the buyer keys of the one of the buyer accounts and the transaction engine is configured to determining consensus for the transaction after the single transaction block is posted to the notary blockchain by validating whether the buyer keys of the transaction request are authentic.

21. The blockchain transaction system of claim 20, wherein the buyer keys are stored on the buyer device and the buyer blockchain operating system prevents use of the buyer keys in the transaction request unless a user of the buyer device passes a biometric verification test.

22. The blockchain transaction system of claim 21, wherein the biometric verification test includes inputting biometric data from the user comprising one or more of a face image, an retinal image, a fingerprint and a voice signal and determining if the inputted biometric data matches stored reference biometric data associated with the buyer account.

23. The blockchain transaction system of claim 22, wherein the transaction data includes one or more of the seller identifier, the buyer identifier, the product identifier, a price of the product and a time of the transaction, a value of currency paid to the seller identified by the seller identifier and a percentage of the value owed to the notary blockchain operating system.

24. The blockchain transaction system of claim 23, wherein upon receiving a ripcord command from a buyer device associated with one of the buyer accounts, the buyer blockchain operating system is configured to delete the buyer identifier associated with the buyer account.

25. A method of executing transactions between a buyer and a seller in blockchain transaction platform, the method comprising:

storing a plurality of buyer accounts of users of a transaction application with at least one buyer blockchain operating system, the buyer accounts each including a buyer identifier and a set of buyer encrypted keys associated with the buyer account;

generating with the buyer blockchain operating system a separate single transaction block for each of the buyer accounts on a private buyer blockchain, wherein the separate single transaction block that includes encrypted forms of the buyer identifier and an account balance indicating a current value of the buyer account;

storing a plurality of seller accounts with at least one seller blockchain operating system, the seller accounts each including a seller identifier, a set of seller encrypted keys associated with the seller account and sales information, the sales information including one or more product identifiers of products for sale by the seller account and parameters of sales offers associated with each of the products;

generating with the seller blockchain operating system a block for each of the products on a private seller blockchain, the single transaction block including an encrypted form of the product identifier of that product and a smart contract configured to enforce the parameters of the sales offer of that product;

receiving with at least one notary blockchain operating system a transaction request for a transaction from a buyer device, the transaction request including the product identifier of one of the products and the buyer identifier of one of the buyer accounts;

requesting, receiving and executing with the notary blockchain operating system the smart contract of the one of the products from the seller blockchain operating system in order to complete the transaction; and generating and posting with the notary blockchain operating system a single transaction block on a notary blockchain before consensus for the transaction has been determined, the single transaction block including transaction data describing the transaction, wherein each block of the notary blockchain only includes transaction data describing a single transaction.

26. The method of claim 25, further comprising generating with the seller blockchain operating system a separate single transaction block for each of the seller accounts on the seller blockchain, the separate single transaction block including encrypted forms of the seller identifier and an account balance indicating a current value held in the seller account.

27. The method of claim 26, wherein executing the smart contract includes transferring an amount of currency indicated in the smart contract from the buyer account identified by the buyer identifier in the request to the seller account associated with the smart contract.

28. The method of claim 27, wherein when the smart contract is executed, further comprising posting with the buyer blockchain operating system a new single transaction block to the buyer blockchain that changes the account balance of the one of the buyer accounts based on the transaction details, and posting with the seller blockchain operating system a new single transaction block to the seller blockchain that changes the account balance of one of the seller accounts associated with the product identifier based on the transaction details.

29. The method of claim 28, further comprising settling disputed transactions and producing a settlement summary that indicates how the disputed transaction should be adjusted with the notary blockchain operating system.

30. The method of claim 29, further comprising generating and posting with the notary blockchain operating system a single updated transaction block on the notary blockchain based on the settlement summary, the single updated transaction block including transaction data describing the adjustments to the disputed transaction indicated in the settlement summary.

31. The method of claim 30, wherein when the notary blockchain operating system generates and posts the single updated transaction block on the notary blockchain based on the settlement summary, further comprising for each of the buyer accounts whose account balance is changed by the settlement summary, posting with the buyer blockchain operating system a new single updated transaction block to the buyer blockchain that changes the account balance of the buyer accounts based on the settlement summary, and for each of the seller accounts whose account balance is changed by the settlement summary, posting with the seller blockchain operating system a new single updated transaction block to the seller blockchain that changes the account balance of the seller accounts based on the settlement summary.

32. The method of claim 31, wherein the request includes the buyer keys of the one of the buyer accounts, further comprising determining consensus for the transaction with the transaction engine after the single transaction block is posted to the notary blockchain by validating whether the buyer keys of the transaction request are authentic.

33. The method of claim 32, wherein the buyer keys are stored on the buyer device, further comprising preventing use of the buyer keys in the transaction request with the buyer blockchain operating system unless a user of the buyer device passes a biometric verification test.

34. The method of claim 33, wherein the biometric verification test includes inputting biometric data from the user comprising one or more of a face image, an retinal image, a fingerprint and a voice signal and determining if the inputted biometric data matches stored reference biometric data associated with the buyer account.

35. The method of claim 34, wherein the transaction data includes one or more of the seller identifier, the buyer identifier, the product identifier, a price of the product and a time of the transaction, a value of currency paid to the seller identified by the seller identifier and a percentage of the value owed to the notary blockchain operating system.

36. The method of claim 35, further comprising deleting the buyer identifier associated with the buyer account with the buyer blockchain operating system upon receiving a ripcord command from a buyer device associated with one of the buyer accounts.

37. The blockchain transaction platform of claim 1, wherein the posting of the single transaction block on the notary blockchain before full node consensus for the transaction has been determined comprises linking the single transaction block to a previous block on the notary blockchain.

* * * * *